US010894666B2

(12) United States Patent
Bergkamp et al.

(10) Patent No.: US 10,894,666 B2
(45) Date of Patent: Jan. 19, 2021

(54) TELESCOPING ROTATABLE TOOL

(71) Applicant: Bergkamp Incorporated, Salina, KS (US)

(72) Inventors: Alan R. Bergkamp, Hutchinson, KS (US); Jason J. Bergkamp, Mount Hope, KS (US); Caleb Abell, Solomon, KS (US); Adam Ray, Salina, KS (US)

(73) Assignee: Bergkamp Incorporated, Salina, KS (US)

( * ) Notice: Subject to any disclaimer, the term of this patent is extended or adjusted under 35 U.S.C. 154(b) by 0 days.

(21) Appl. No.: 16/858,378

(22) Filed: Apr. 24, 2020

(65) Prior Publication Data

US 2020/0339359 A1 Oct. 29, 2020

Related U.S. Application Data

(60) Provisional application No. 62/838,540, filed on Apr. 25, 2019.

(51) Int. Cl.
| | |
|---|---|
| *B65G 33/30* | (2006.01) |
| *B65G 33/26* | (2006.01) |
| *E01C 19/18* | (2006.01) |
| *A01D 41/12* | (2006.01) |
| *B60P 1/42* | (2006.01) |
| *A01D 90/10* | (2006.01) |
| *B60P 1/40* | (2006.01) |
| *A01D 61/00* | (2006.01) |

(52) U.S. Cl.
CPC ......... *B65G 33/30* (2013.01); *A01D 41/1217* (2013.01); *A01D 61/00* (2013.01); *A01D 90/10* (2013.01); *B60P 1/40* (2013.01); *B60P 1/42* (2013.01); *E01C 19/187* (2013.01)

(58) Field of Classification Search
CPC ............................... B65G 33/26; B65G 33/30
USPC ......................................... 198/660, 666, 778
See application file for complete search history.

(56) References Cited

U.S. PATENT DOCUMENTS

| | | | |
|---|---|---|---|
| 2,845,167 A | 10/1956 | Heiken | |
| 3,605,995 A | 9/1971 | Maack | |
| 4,014,431 A * | 3/1977 | Angeletti | ............... B65G 33/12 198/660 |

(Continued)

OTHER PUBLICATIONS

Search Report and Written Opinion dated Jul. 2, 2020 for related PCT Application No. PCT/US2020/029921, 13 pages.

*Primary Examiner* — Douglas A Hess
(74) *Attorney, Agent, or Firm* — Hovey Williams LLP; Kameron D. Kelly

(57) ABSTRACT

A telescoping rotatable tool includes a first shaft and a second shaft. The first shaft has a first material-engaging element extending from an exterior surface of the first shaft. The second shaft has a second material-engaging element extending from an exterior surface of the second shaft. The second shaft is configured to extend from and retract within an interior space presented by the first shaft. The first shaft includes at least one helical-shaped groove extending along an interior surface of the first shaft. The second shaft includes at least one guide element extending from the exterior surface of the second shaft. The guide element is configured to engage with the groove, such that as the second shaft extends from and retracts within the first shaft, the second shaft is configured to rotate with respect to the first shaft.

25 Claims, 23 Drawing Sheets

(56) References Cited

U.S. PATENT DOCUMENTS

| | | | |
|---|---|---|---|
| 4,356,910 A | | 11/1982 | Togstad |
| 4,772,156 A | * | 9/1988 | Craig .................... E01C 19/42 |
| | | | 404/101 |
| 4,989,716 A | * | 2/1991 | Stuckey ................ B65G 33/32 |
| | | | 198/311 |
| 5,099,986 A | | 3/1992 | Kuzub |
| 5,871,081 A | | 2/1999 | Gaalswyk et al. |
| 5,980,153 A | * | 11/1999 | Plemons .............. E01C 19/185 |
| | | | 198/657 |
| 7,381,131 B1 | * | 6/2008 | Harpole ................. A01F 12/46 |
| | | | 198/671 |
| 8,746,439 B2 | | 6/2014 | Houssian |
| 9,068,298 B2 | * | 6/2015 | Everett ................ E01C 19/187 |
| 9,376,261 B1 | * | 6/2016 | Miller .................... E01H 5/076 |

* cited by examiner

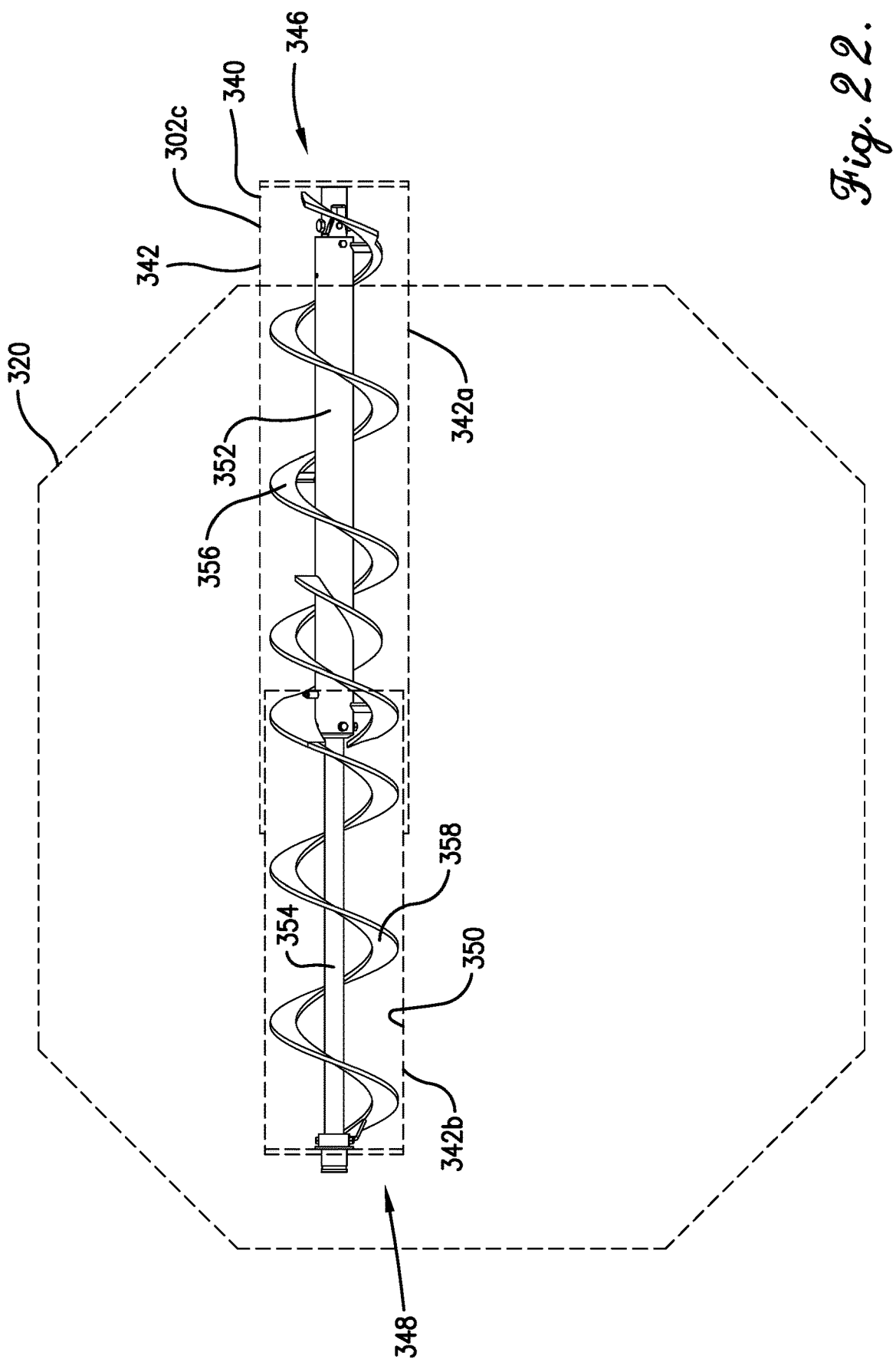

TELESCOPING ROTATABLE TOOL

CROSS-REFERENCE TO RELATED APPLICATIONS

This application claims the benefit of U.S. Provisional Application Ser. No. 62/838,540, filed Apr. 25, 2019, entitled TELESCOPING AUGER, which is hereby incorporated in its entirety by reference herein.

BACKGROUND

1. Field

The present invention relates generally to material-conveying augers used in paving equipment, agricultural equipment, bulk material handling, and other industrial applications. More specifically, embodiments of the present invention concern a telescopic auger that is selectively extendable and retractable.

2. Discussion of Prior Art

It is well known in the art for a mobile paving system to deploy slurry material to a road surface and spread the slurry evenly along the surface using a screed-type device, such as a spreader box. Conventional spreader boxes include a powered auger to distribute slurry material along the width of the spreader box. Prior art mobile paving systems may allow operators to change the spreader box width by physically adding or removing sections of the spreader box, accompanying auger flights or paddles, and strike-off devices.

However, changing of spreader box sections has various disadvantages. For instance, replacement of spreader box sections is known to be laborious and time consuming. Because of this difficulty, users of the mobile paving systems often choose not adjust the spreader box. Without adjusting the spreader box width, multiple passes of the spreader box are generally necessary to cover the entire roadway surface, which serves to waste slurry material and create an uneven surface.

Some conventional spreader boxes are provided with an adjustable length auger that permits width adjustment of the spreader box. However, these known spreader boxes are also problematic. For instance, conventional augers having an adjustable length are susceptible to inoperability or damage due to foreign debris or other contaminants. More specifically, adjustable length augers have interengaging joints between auger sections that readily collect debris and interfere with normal auger operation, such as auger length adjustment.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a telescoping rotatable tool that does not suffer from the problems and limitations of prior art devices, including those set forth above.

A first aspect of the present invention concerns a telescoping rotatable tool configured to move material. The telescoping rotatable tool broadly includes a first shaft and a second shaft. The first shaft has a first material-engaging element extending from an exterior surface of the first shaft. The second shaft has a second material-engaging element extending from an exterior surface of the second shaft. The second shaft is configured to extend from and retract within an interior space presented by the first shaft. The first shaft includes at least one helical-shaped groove extending along an interior surface of the first shaft. The second shaft includes at least one guide element extending from the exterior surface of the second shaft. The guide element is configured to engage with the groove, such that as the second shaft extends from and retracts within the first shaft, the second shaft is configured to rotate with respect to the first shaft.

A second aspect of the present invention concerns a method of using a telescoping rotatable tool. The method includes the steps of providing the telescoping rotatable tool and causing the second shaft to extend from the interior space of the first shaft. The auger comprises a first shaft with a first material-engaging element extending exteriorly therefrom, and a second shaft with a second material-engaging element extending exteriorly therefrom. The second shaft is configured to extend from and retract within an interior space presented by the first shaft. The first shaft includes a helical-shaped groove extending along an interior surface of the first shaft. The second shaft includes an engagement element extending from an exterior surface of the second shaft, and wherein the engagement element is received within the groove. As the second shaft is extended, the engagement element travels through the groove causing the second shaft to rotate with respect to the first shaft.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 17:
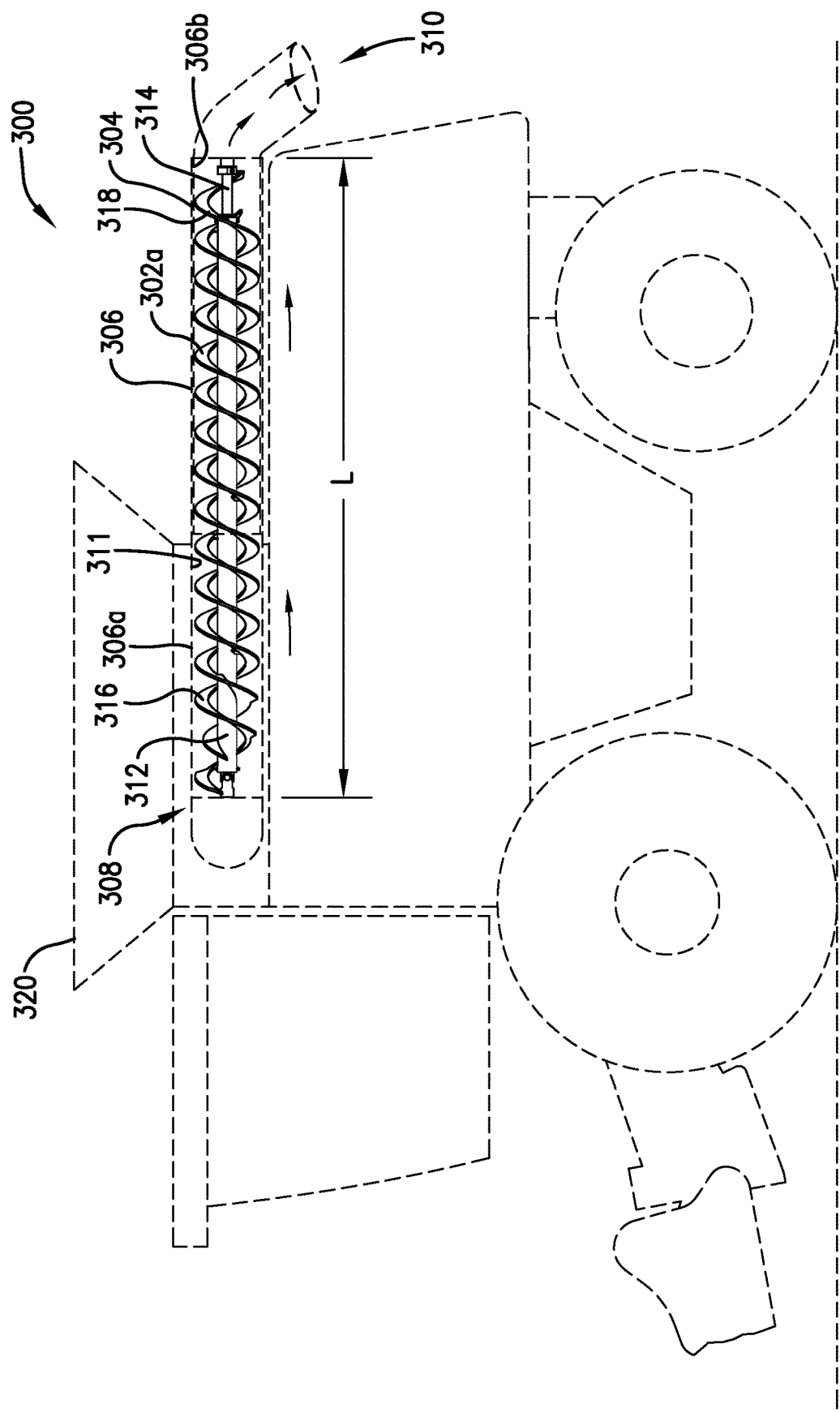
FIGS. 17 and 18 are schematic side elevation views of a crop harvesting machine constructed in accordance with a third embodiment of the present invention, with the machine having an unloading auger assembly to unload grain from a grain tank, and showing a telescoping auger of the auger assembly shifted between retracted and extended configurations.
Figure 18:
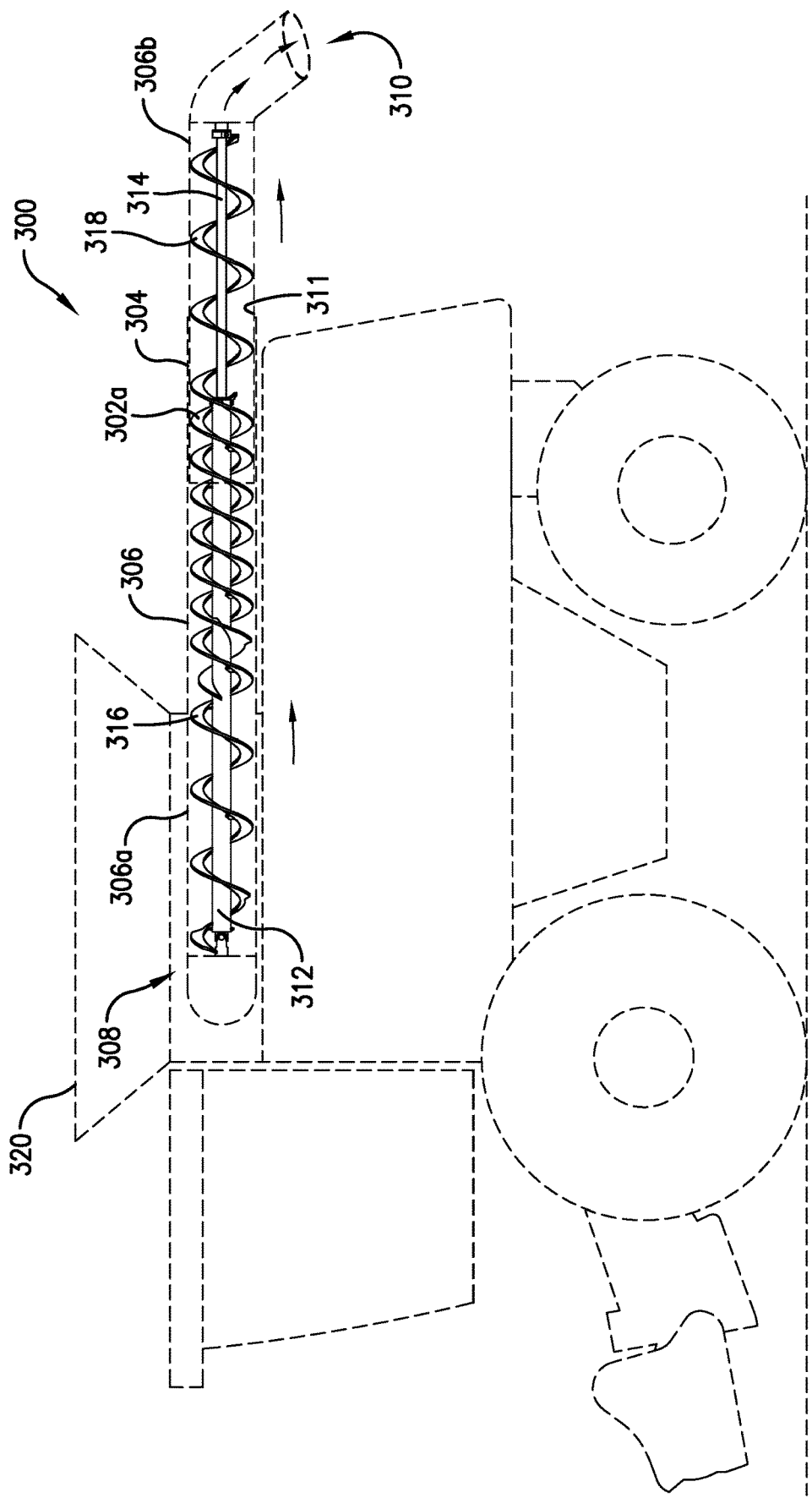
Figure 19:
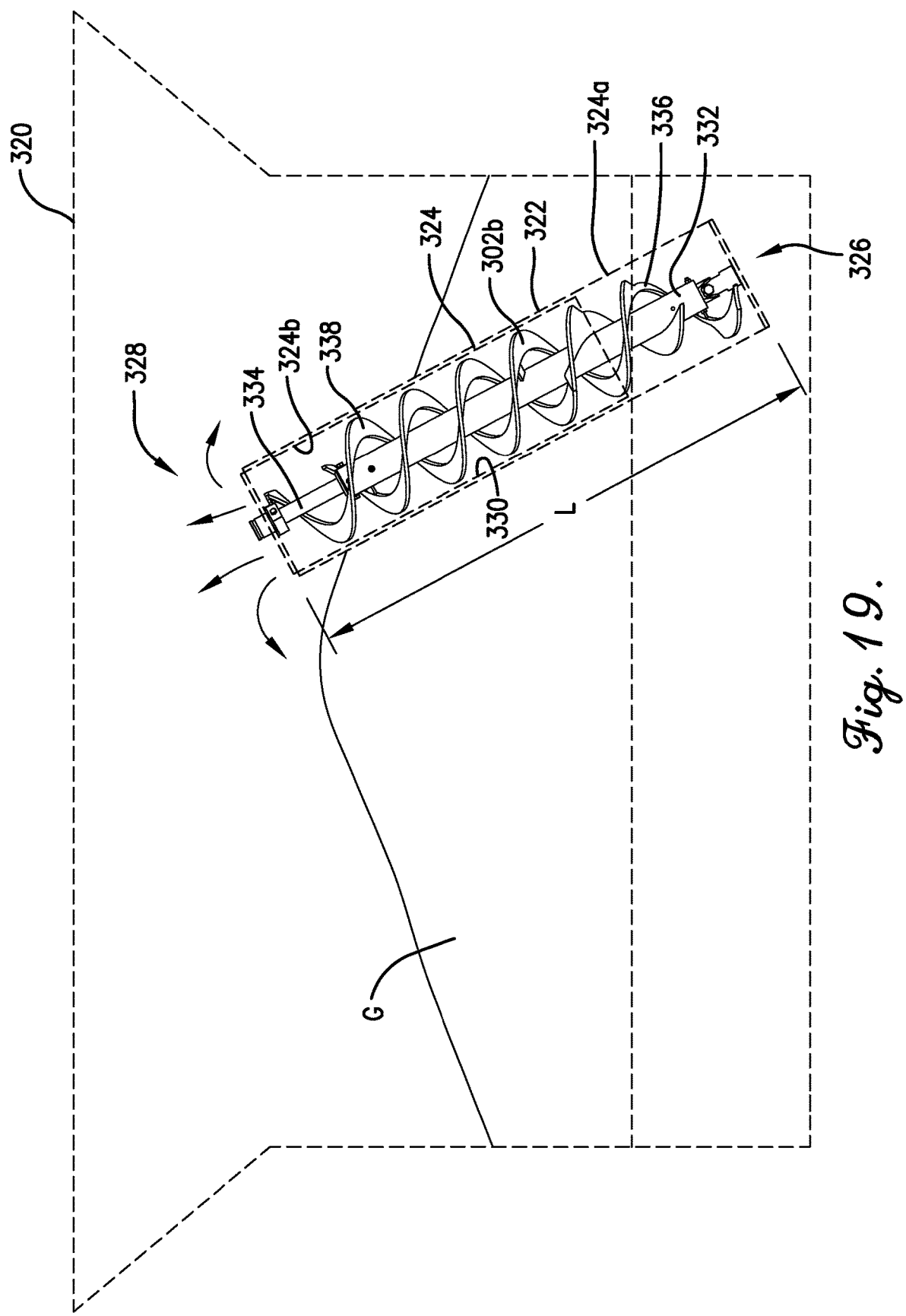
Figure 20:
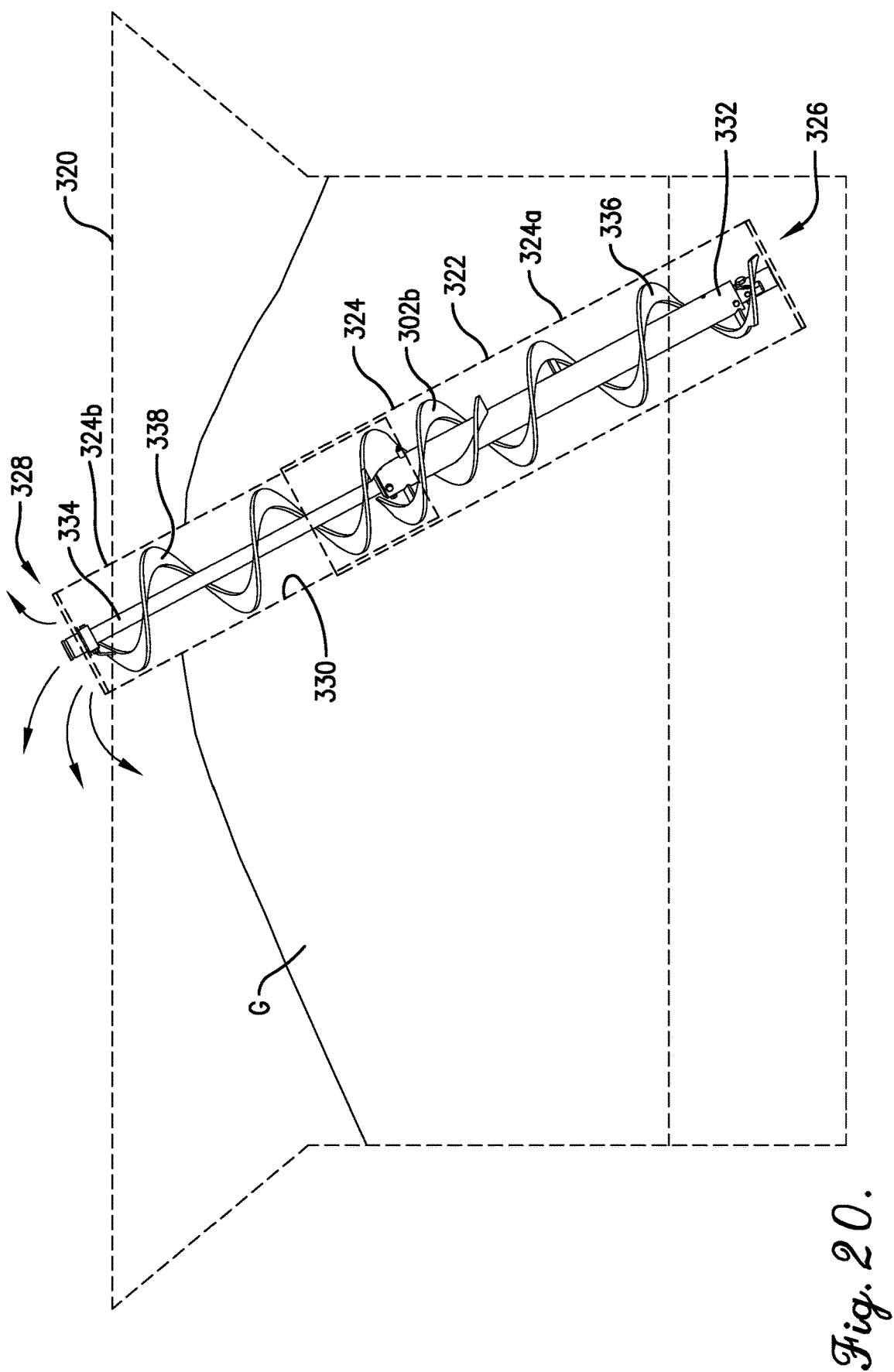
Figure 21:
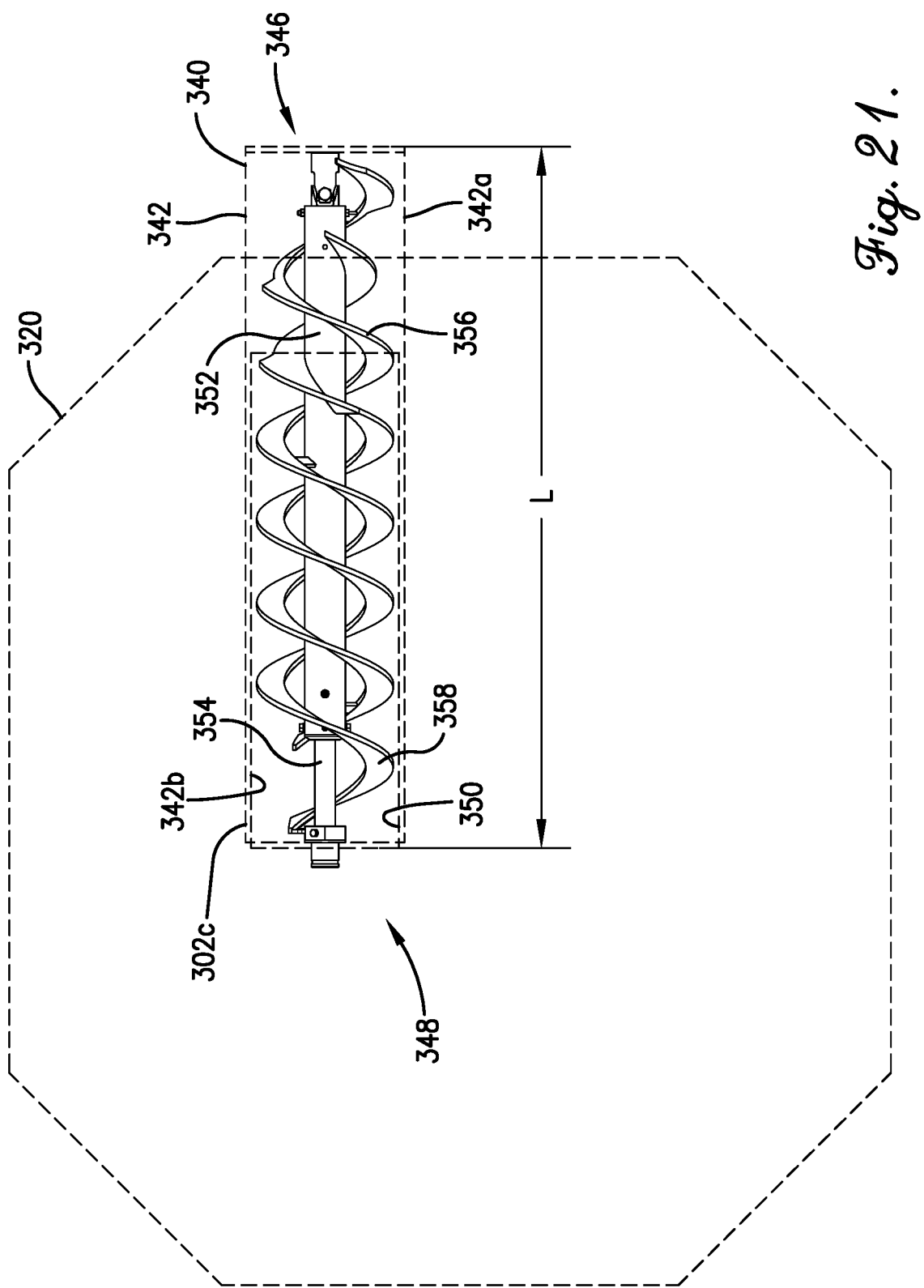

FIGS. 19 and 20 are fragmentary schematic front elevation views of the crop harvesting machine shown in FIGS. 17 and 18, showing a grain tank with a "bubble-up" auger assembly to discharge grain into the tank, showing a telescoping auger of the auger assembly shifted between retracted and extended configurations; and FIGS. 21 and 22 are fragmentary schematic top views of the crop harvesting machine shown in FIGS. 17-20, showing a grain tank with a cleanout auger assembly to remove grain from the grain tank, showing a telescoping auger of the cleanout auger assembly shifted between retracted and extended configurations.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Spreader Box

Turning initially to FIGS. 1-10, an expandable spreader box 30 is constructed in accordance with a preferred embodiment of the present invention and preferably includes telescoping augers 32a,32b,32c,32d. As will be explained, each auger 32 is configured to be selectively extended and retracted to change a length dimension L of the auger 32.

In the usual manner, the spreader box 30 is preferably supported by a mobile slurry vehicle (not shown) to distribute a slurry material (not shown). The spreader box 30 preferably includes, among other things, the augers 32, box frame sections 34,36, box frame cylinders 38, and auger rotary drive motors 40.

In the exemplary embodiment, each box frame section 34,36 contains and supports a pair of telescoping augers 32. In particular, box frame section 34 receives and supports telescoping augers 32a and 32b, and box frame section 36 receives and supports telescoping augers 32c and 32d.

As depicted in FIGS. 4-8, the box frame sections 34,36 each include inner and outer frame channels 42,44, end auger supports 46, and an intermediate auger support 48. The end auger supports 46 are located at respective opposite lateral ends 34a,36a of the box frame sections 34,36. The end auger supports 46 preferably interconnect respective pairs of inner frame channels 42 and cooperate with the frame channels 42 to form a shiftable frame structure 49a slidable relative to the outer frame channels 44.

Preferably, the intermediate auger support 48 is spaced between the lateral ends 34a,36a and interconnects the pairs of outer frame channels 44. Thus, the intermediate auger support 48 and outer frame channels 44 cooperatively form a rigid frame structure 49b.

The depicted frame channels 42,44 are telescopically engaged with one another. In particular, the engaged frame channels 42,44 are slidable relative to one another between an expanded condition (see FIGS. 4-7) and a contracted condition (see FIGS. 1-3). In the expanded condition, the end auger support 46 is located in a laterally outboard position. In the contracted condition, the end auger support 46 is located in a laterally inboard position.

Each pair of frame channels 42,44 cooperatively receive and support a respective one of the box frame cylinders 38 (see FIGS. 3 and 6-8). The box frame cylinders 38 are each operable to selectively shift the sections 34,36 between the expanded and contracted conditions. In particular, each shiftable frame structure 49*a* is configured to be extended and retracted relative to the frame structure 49*b* by a corresponding pair of box frame cylinders 38.

Although the shiftable frame structures 49*a* are preferably driven relative to each other by the box frame cylinders 38, the spreader box may have an alternative linear actuator (such as an electric or pneumatic motor) to axially shift the box frame sections relative to each other. As will be explained, one or more telescoping augers may be configured as a hydraulic cylinder and operable to shift the box frame sections between the expanded and contracted conditions.

Furthermore, it is within the ambit of the present invention for alternative spreader box embodiments to include an alternative powered drive mechanism. For instance, the spreader box may have a rotary actuator (such as a rotatable hydraulic motor, a rotatable pneumatic motor, or a rotatable electric motor) to shift the box frame sections.

Although the sections 34,36 can be expanded independently of each other, both of the illustrated sections 34,36 are shown as expanded at the same time. In operation, as section 34 expands, telescoping augers 32*a,b* also extend such that the slurry material will be evenly distributed throughout the width of section 34. Similarly, telescoping augers 32*c,d* extend as section 36 expands such that the slurry material will be evenly distributed throughout the width of section 36.

Telescoping Auger

Turning to FIGS. 11-16, each telescoping auger 32 provides a preferred embodiment of a telescoping rotatable tool and preferably includes a first shaft 50 with a first auger section 52. The first shaft 50 preferably includes inner and outer shaft sleeves 51*a,b* that are connected to each other with fasteners 51*c*. The sleeves 51*a,b* are preferably connected to each other by fasteners 51*c* so that the sleeves 51*a,b* move together and cooperatively provide the first shaft 50. The first shaft 50 also presents proximal and distal ends 50*a,b*. The first shaft 50 also includes a drive coupler 53 associated with the proximal end 50*a*. The drive coupler 53 is driving attached to the sleeves 51*a,b* by a universal joint 53*a* (see FIG. 11).

Figure 16:
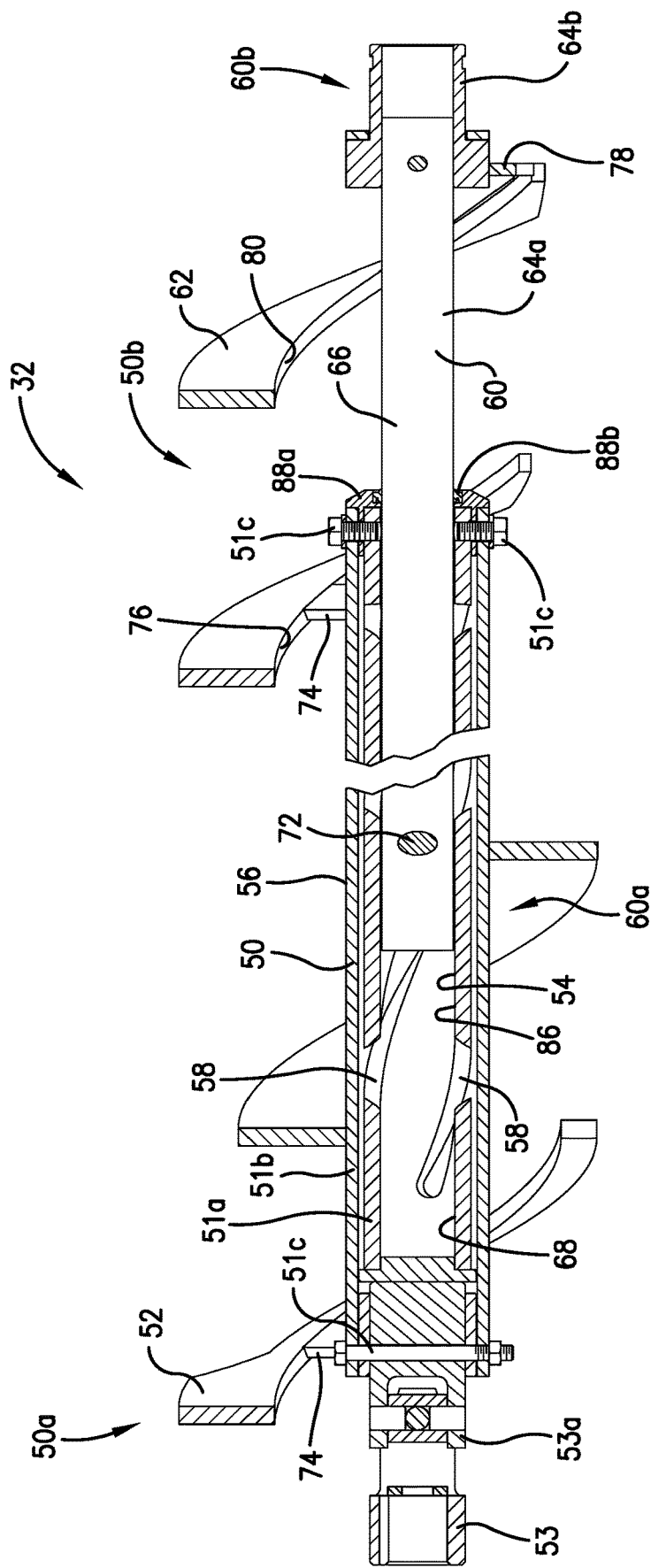
FIG. 16 is a cross-sectional view of the telescoping auger taken along line 16-16 in FIG. 15.

The first shaft 50 also presents a first interior surface 54 and a first exterior surface 56 that extend between the ends 50*a,b* (see FIG. 16). The outer sleeve 51*b* presents the exterior surface 56 of the first shaft 50, while the inner sleeve 51*a* presents the interior surface 54 of the first shaft 50. As will be discussed, the first shaft 50 includes helical-shaped grooves 58 extending along the first interior surface 54 of the first shaft 50 (see FIG. 16).

The first auger section 52 extends from the first exterior surface 56 of the first shaft 50. The first auger section 52 preferably comprises helical auger fighting that is substantially continuous along the length of the shaft 50. However, the fighting could be variously configured within the scope of the present invention. For instance, in alternative embodiments, the fighting may have a segmented configuration, with flighting segments spaced along the shaft length.

Each telescoping auger 32 also preferably includes a second shaft 60 with a second auger section 62. The second shaft 50 presents proximal and distal ends 60*a,b*. The second shaft includes a body 64*a* and a coupler 64*b* attached to the body 64*a*. The second shaft 60 also presents a second exterior surface 66. The second shaft 60 is configured to extend from and retract within an interior space 68 presented by the first shaft 50 (see FIG. 16).

The second auger section 62 extends from the second exterior surface 66 of the second shaft 60. The second auger section 62 preferably comprises helical auger fighting that is substantially continuous along the length of the shaft 60. However, the fighting could be variously configured within the scope of the present invention. For instance, in alternative embodiments, the fighting may have a segmented configuration, with fighting segments spaced along the shaft length.

Furthermore, it is within the scope of at least some aspects of the present invention for alternative embodiments of the telescoping auger to have alternative material-engaging elements (such as paddles, blades, agitators, screws, etc.) supported by one or both of the shafts (e.g., to engage slurry material), and provided either additionally or alternatively to fighting. For at least certain aspects of the present invention, telescoping shafts may be provided with alternative material-engaging elements to cooperatively provide a telescoping rotatable tool that is configured to agitate, impinge, stir, blend, mix, pump, convey, spread, scrape, and/or otherwise move material. In such alternative embodiments, it will be appreciated that a telescoping rotatable tool may have telescoping shafts that support one or more alternative material-engaging elements but do not support an auger fighting, such that the telescoping rotatable tool may not be considered an auger.

Although the depicted auger is configured to engage and move slurry material along the auger length, alternative embodiments of the telescoping rotatable tool may be configured to move other flowable materials that include liquid materials and/or solid materials (such as grain, particulates, powders, etc.). For instance, as will be shown in a subsequent embodiment, the telescoping auger is configured to be used as part of an agricultural machine for conveying grain.

Figure 15:
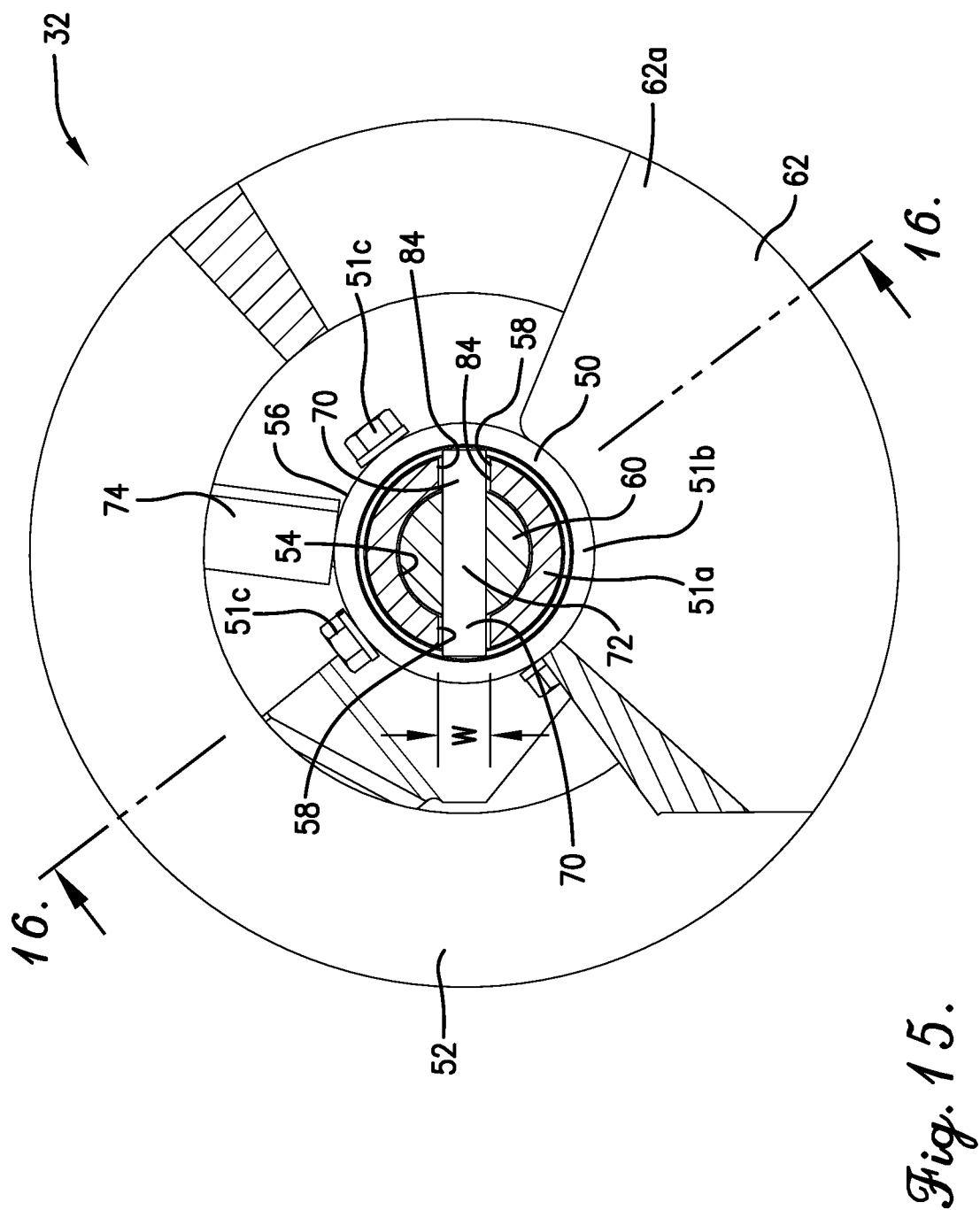
FIG. 15 is a cross-sectional view of the telescoping auger taken along line 15-15 in FIG. 14.

The second shaft 60 also preferably includes a pair of opposite guide elements 70 provided by a guide pin 72 (see FIG. 15). The illustrated guide elements 70 extend from the exterior surface 66 of the second shaft 60. As will be discussed, the guide elements 70 are configured to engage with respective grooves 58, such that as the second shaft 60 extends from and retracts within the first shaft 50, the second shaft 60 is configured to rotate with respect to the first shaft 50.

Embodiments of the present invention may have the first shaft 50 positioned coaxially with and engaging the second shaft 60. In the illustrated embodiment, at least part of the second shaft 60 is received within the interior space 68 presented by the first shaft 50. As such, the second shaft 60 is operable to extend and retract with respect to the first shaft 50 while remaining engaged with the first shaft 50. Thus, in the depicted embodiment, the first shaft 50 may be considered a female shaft, while the second shaft 60 may be considered a male shaft. The shafts 50,60 are associated with respective sections 52,62 of auger fighting positioned radially outwardly relative to the shaft.

Figure 1:
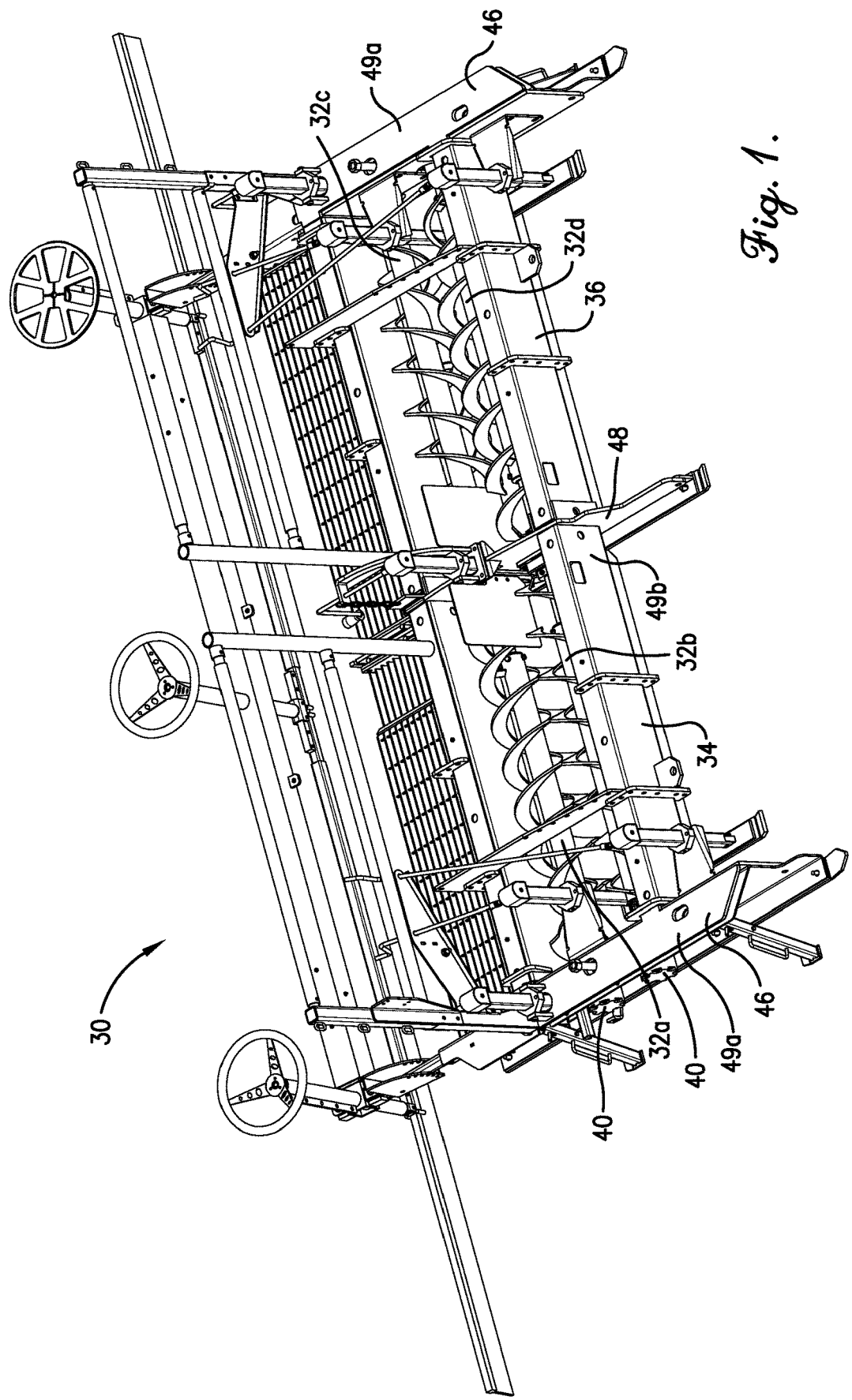
FIG. 1 is a front perspective view of a spreader box constructed in accordance with a preferred embodiment of the present invention.
Figure 2:
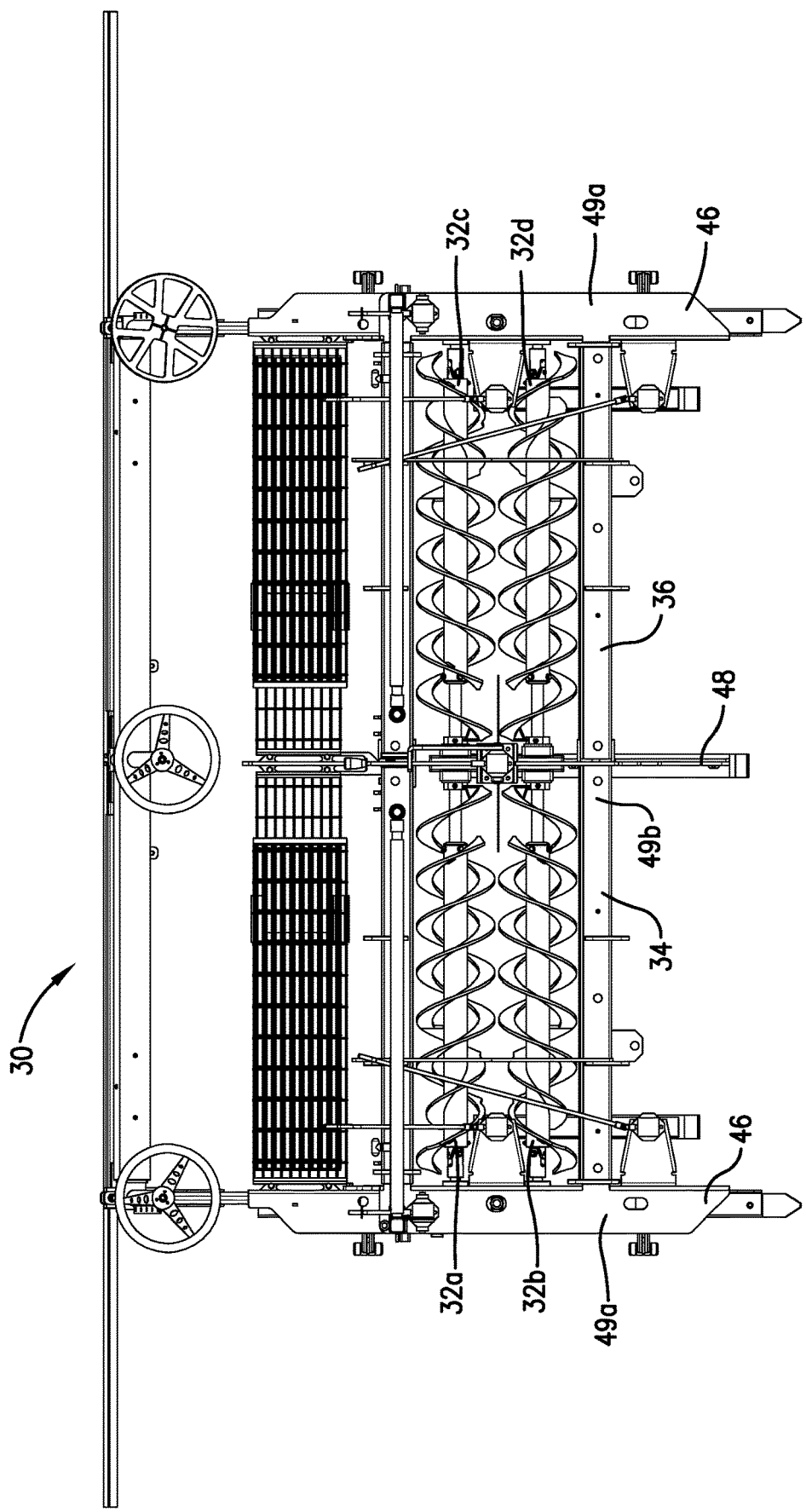
FIG. 2 is a top view of the spreader box shown in FIG. 1, showing box frame sections and telescoping augers of the spreader box, with the spreader box being in a contracted condition.
Figure 3:
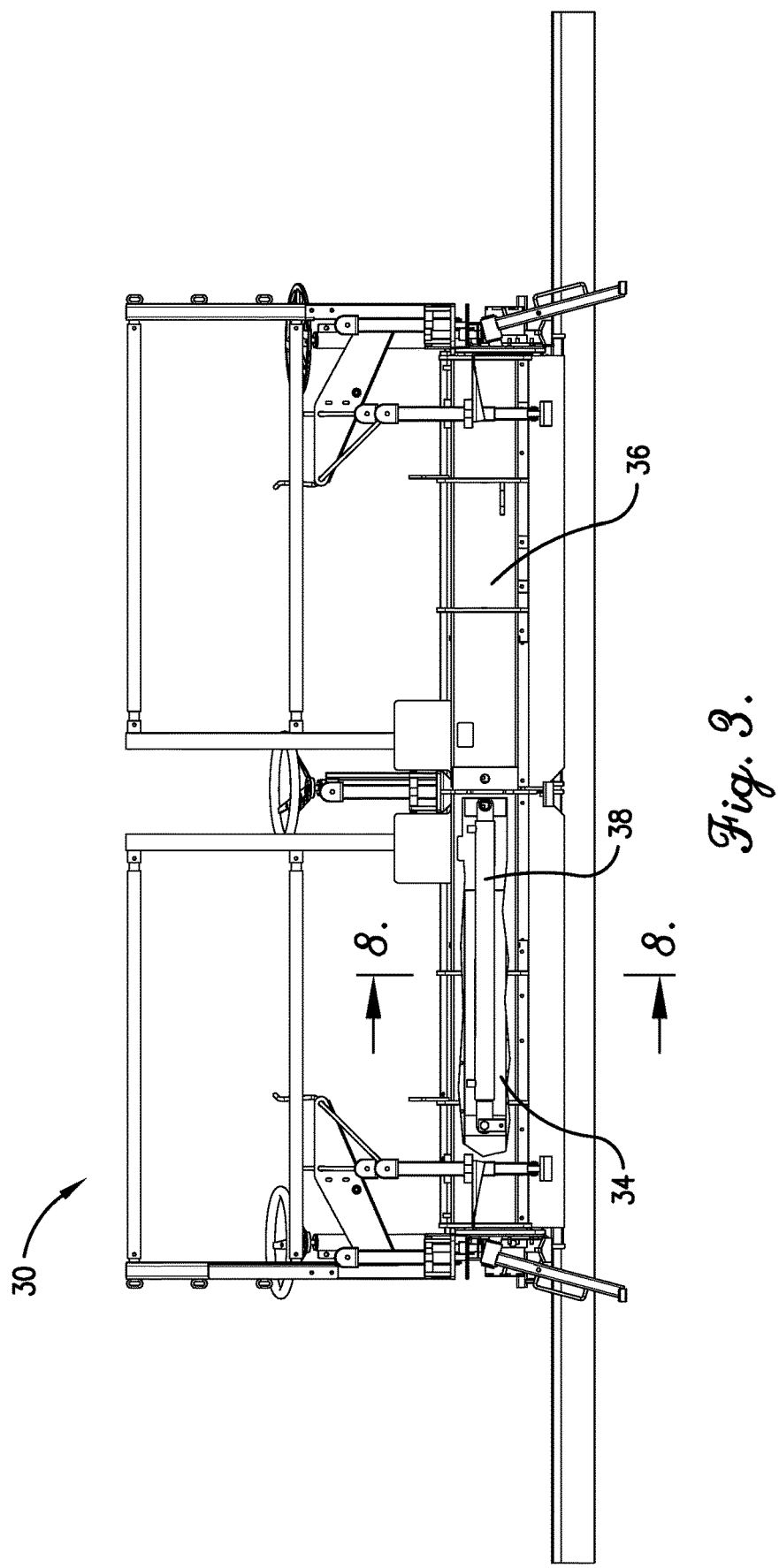
FIG. 3 is a front elevation of the spreader box shown in FIGS. 1 and 2.
Figure 4:
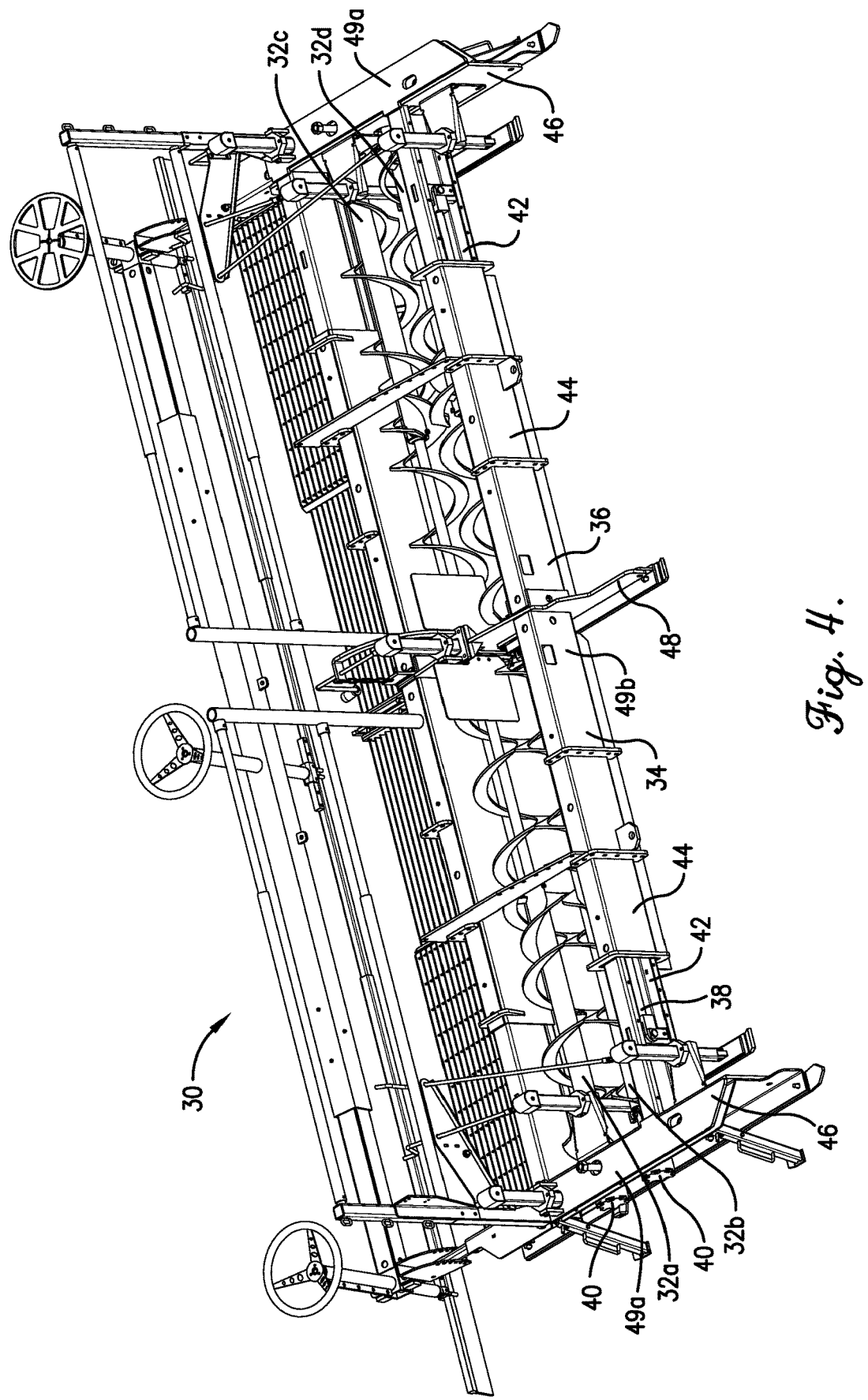
FIG. 4 is a front perspective view of the spreader box similar to FIG. 1, but showing the spreader box in an expanded condition, showing part of the box frame sections removed to depict box frame cylinders, with each of the telescoping augers having first and second shafts extended.
Figure 5:
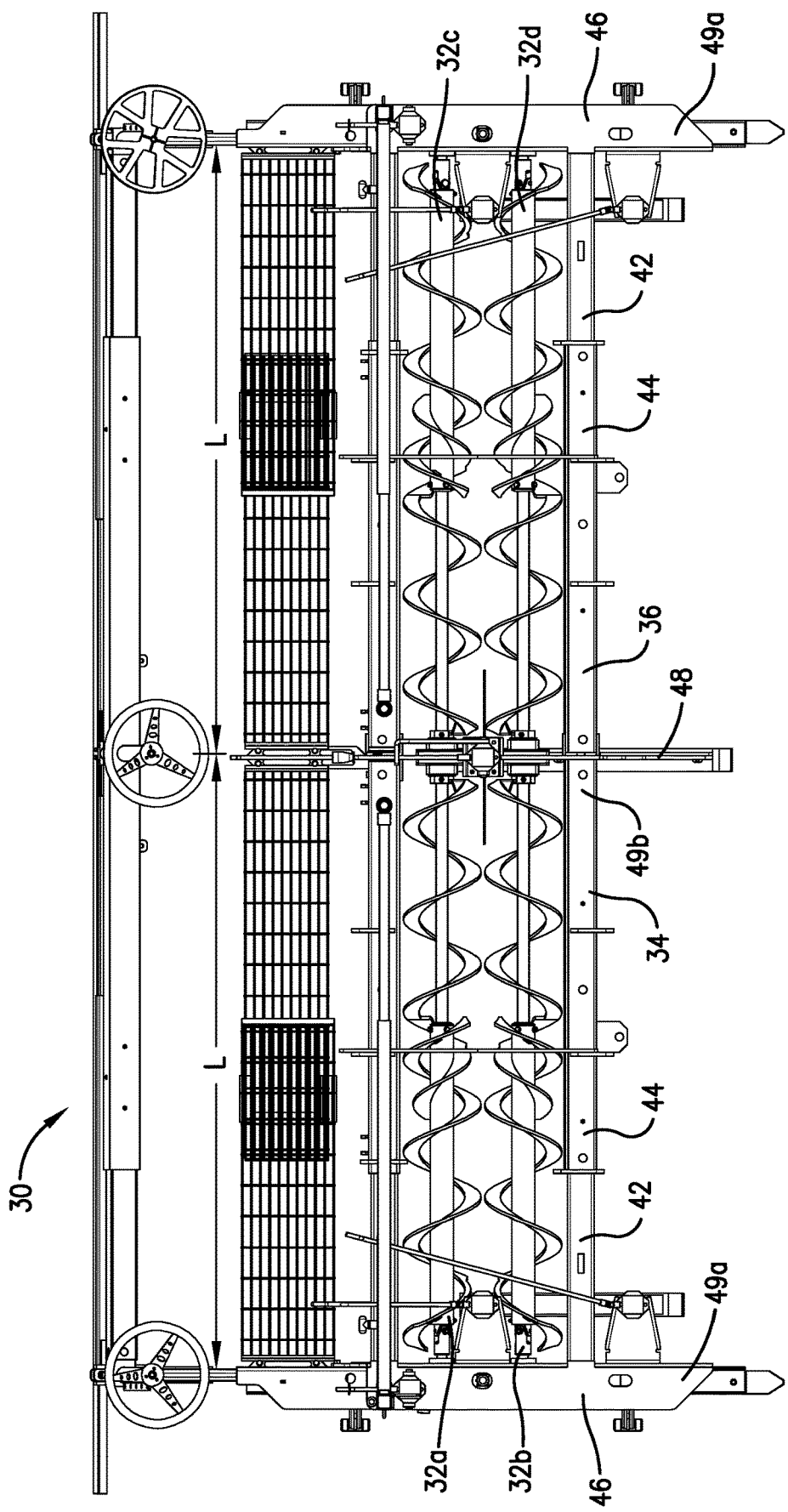
FIG. 5 is a top view of the spreader box shown in FIG. 4.
Figure 6:
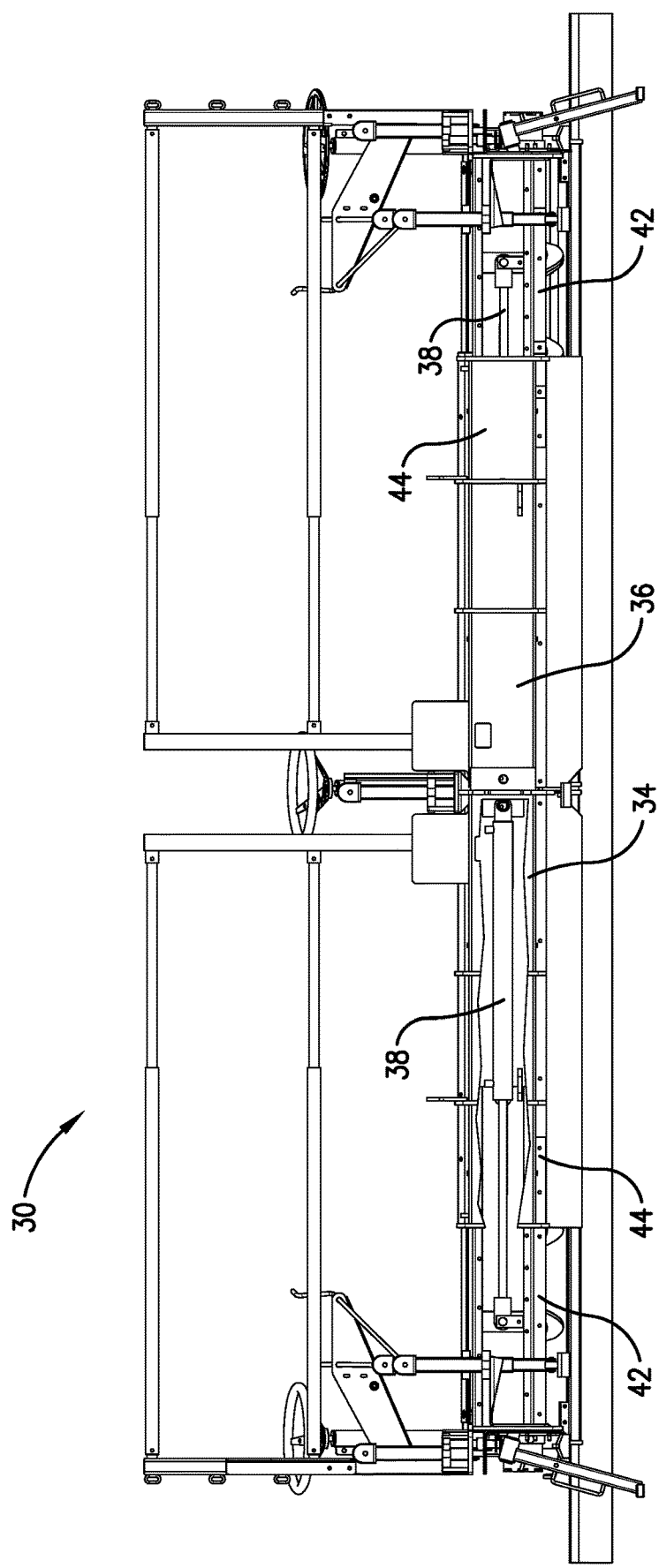
FIG. 6 is a front elevation view of the spreader box shown in FIGS. 4 and 5, showing part of the box frame sections removed to depict box frame cylinders.
Figure 7:
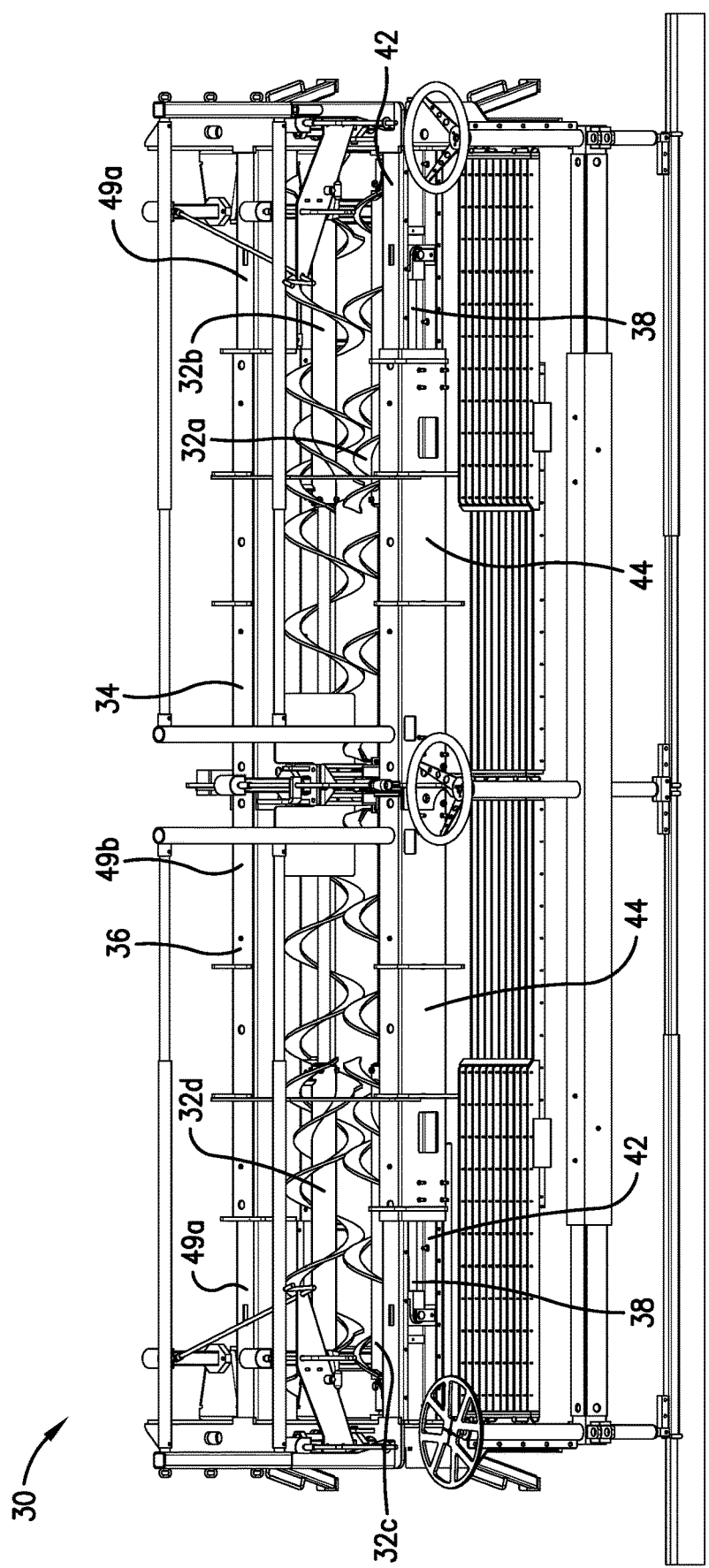
FIG. 7 is a rear perspective view of the spreader box shown in FIGS. 4-6.
Figure 8:
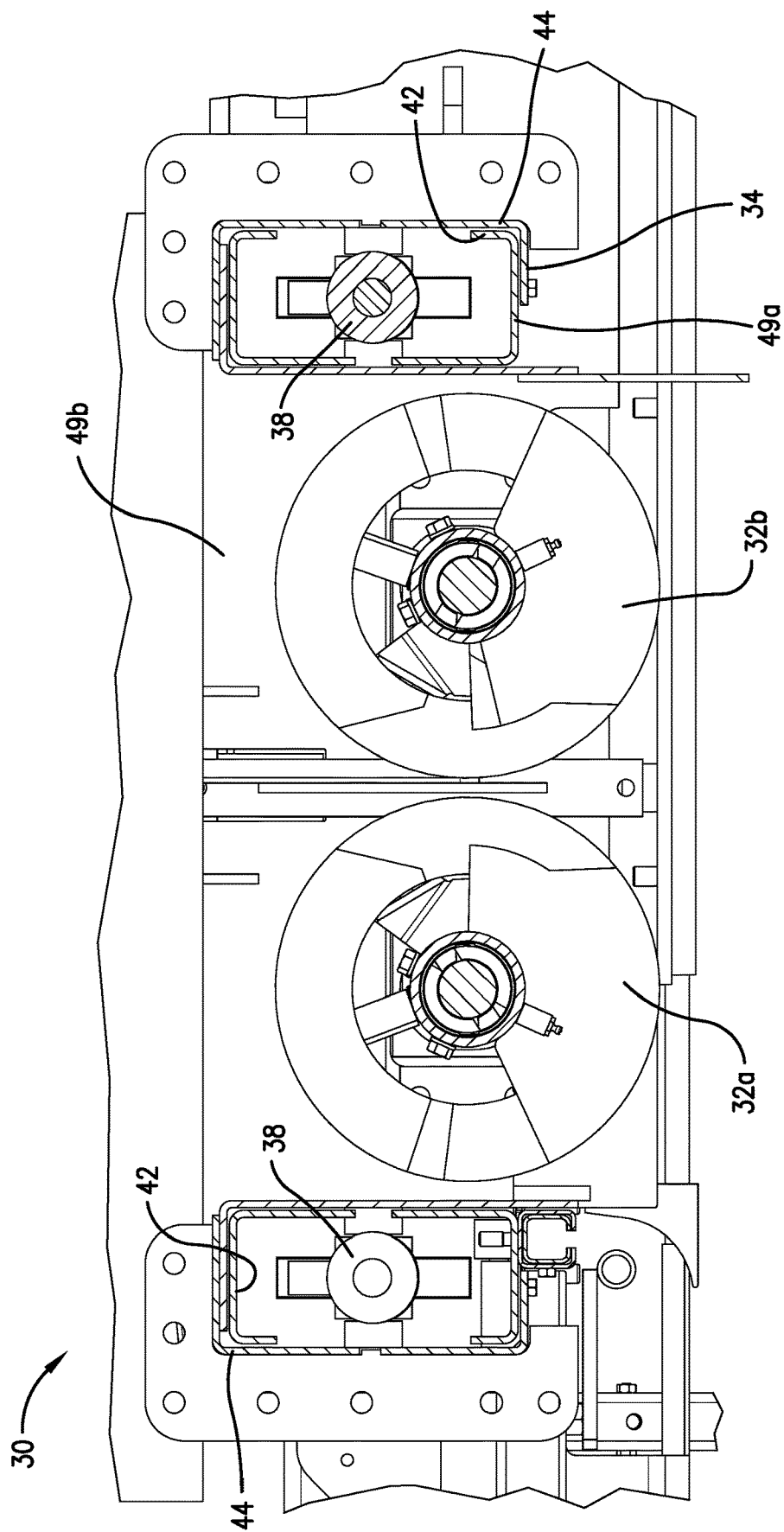
FIG. 8 is a cross-sectional view of the spreader box taken along line 8-8 in FIG. 3.
Figure 9:
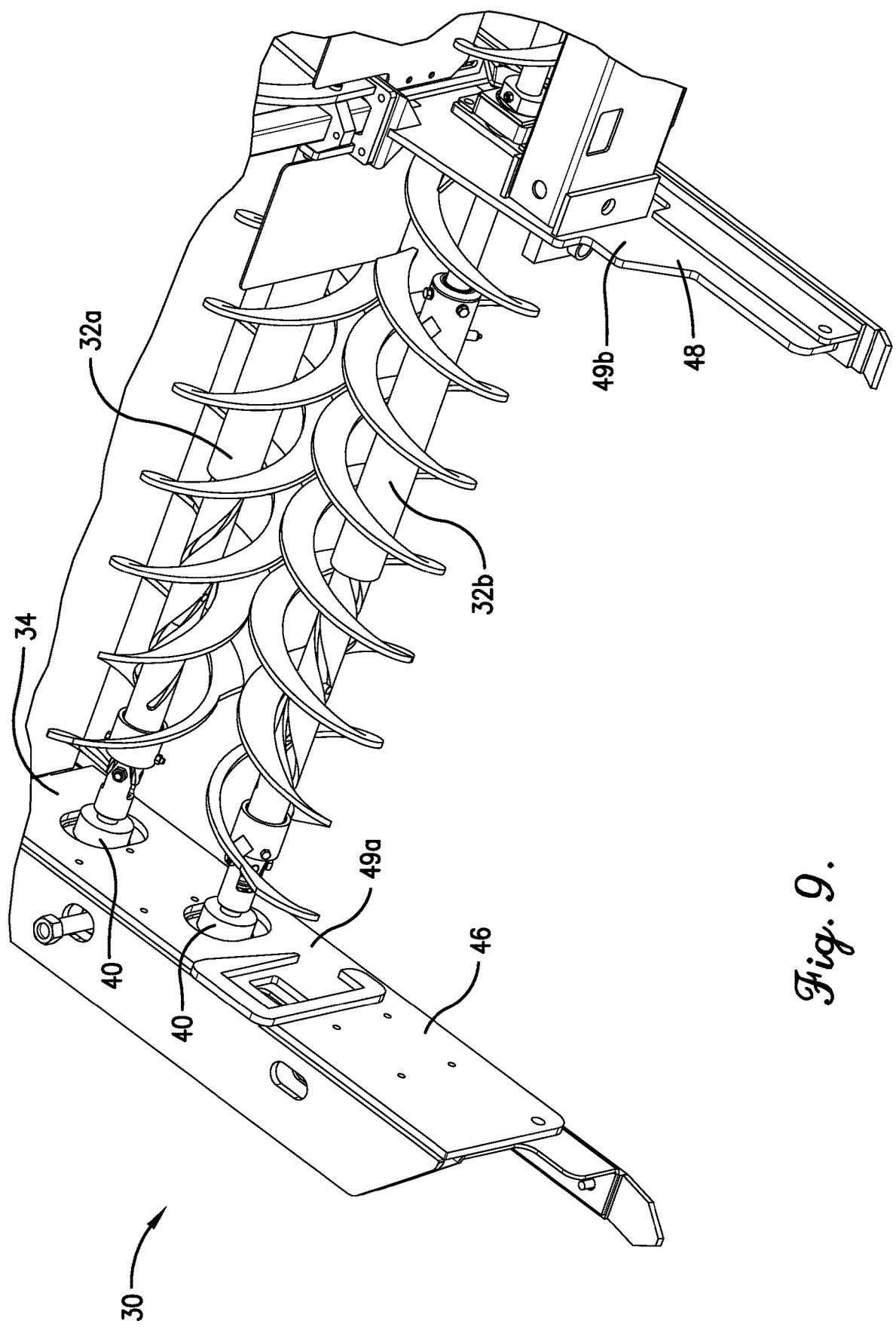
FIG. 9 is a fragmentary perspective view of the spreader box shown in FIGS. 1-3, showing part of an outer sleeve of the first shafts removed to depict grooves formed in an inner sleeve of the first shafts.
Figure 10:
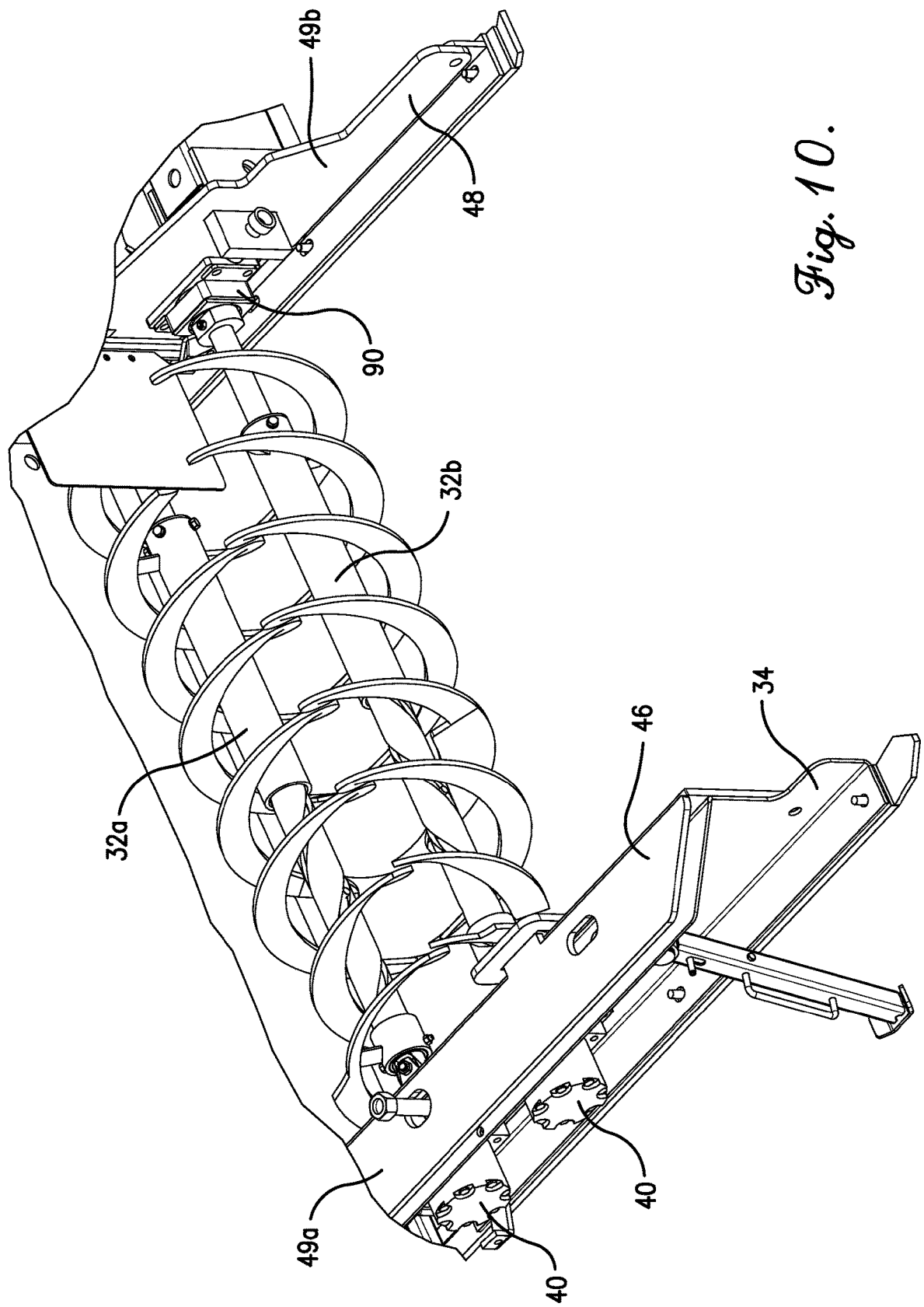
FIG. 10 is a fragmentary perspective view of the spreader box shown in FIGS. 1-3, showing part of an outer sleeve of the first shafts removed to depict grooves formed in an inner sleeve of the first shafts.
Figure 11:
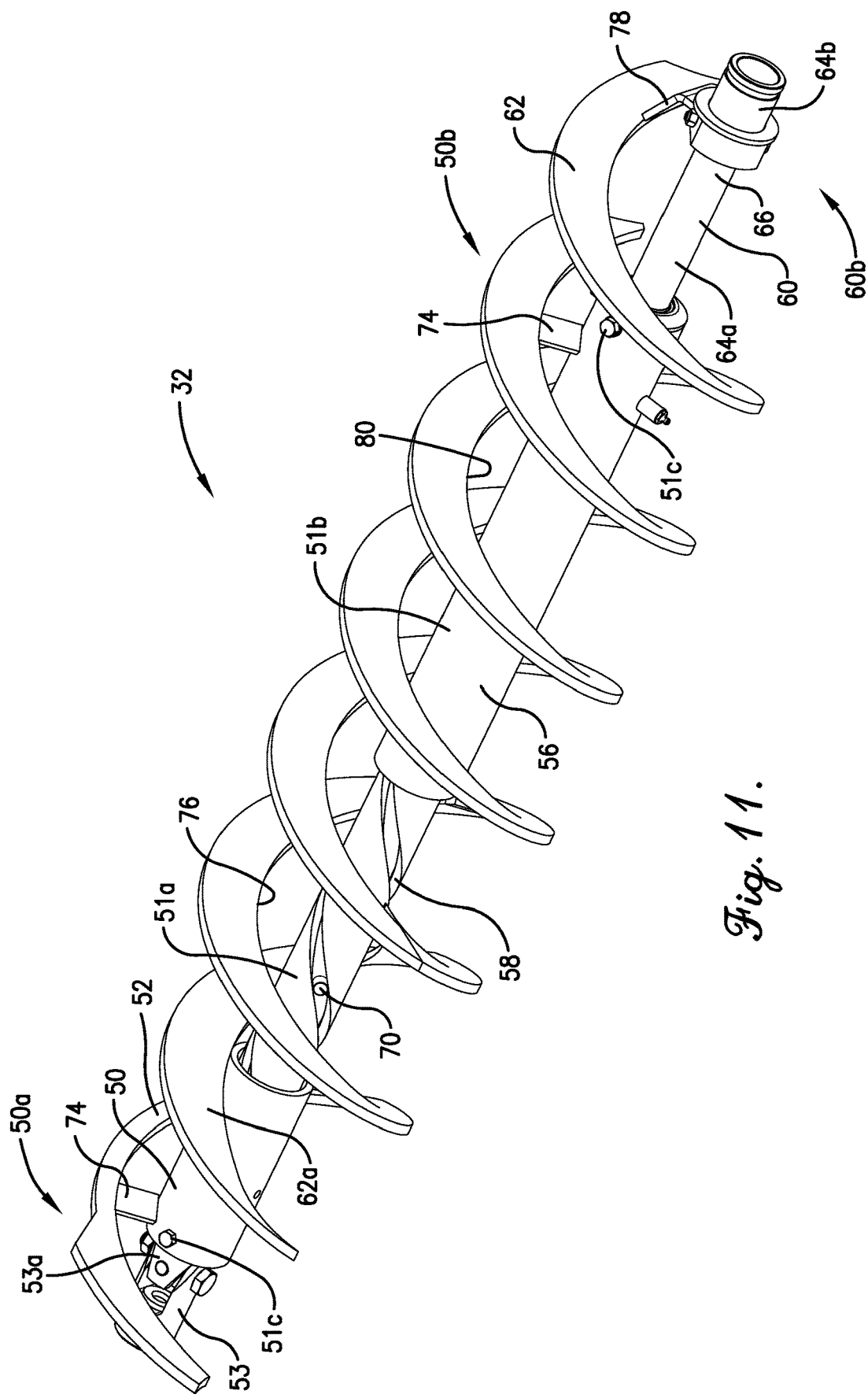
FIG. 11 is a perspective of a telescoping auger shown in FIGS. 1-10, showing first and second shafts, with first and second auger sections, and showing part of the first shaft removed to show a guide element of the second shaft slidably engaged with a groove of the first shaft, and further showing the auger in a retracted configuration.
Figure 12:
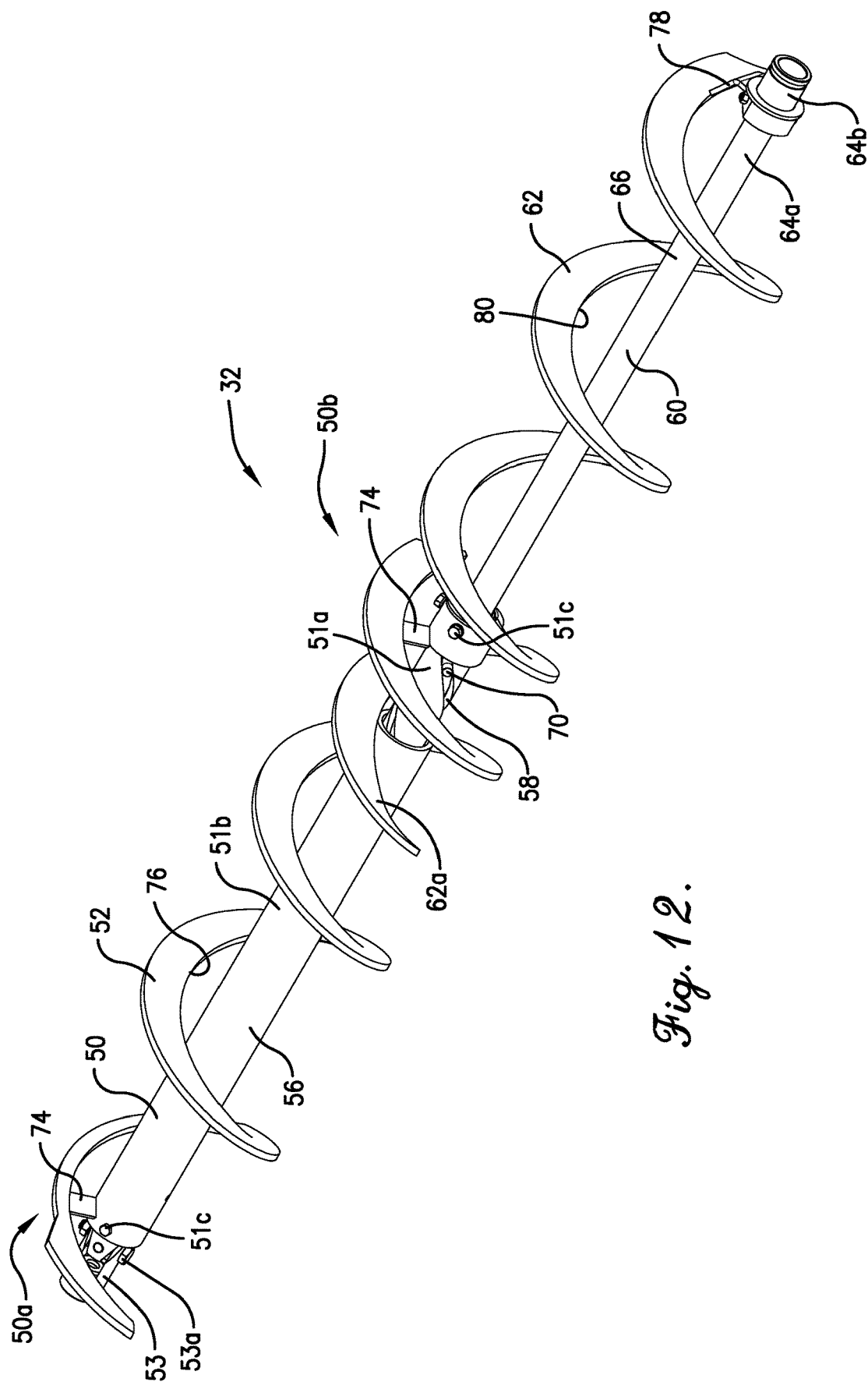
FIG. 12 is a perspective of the telescoping auger similar to FIG. 11, but showing the auger in an extended configuration.
Figure 13:
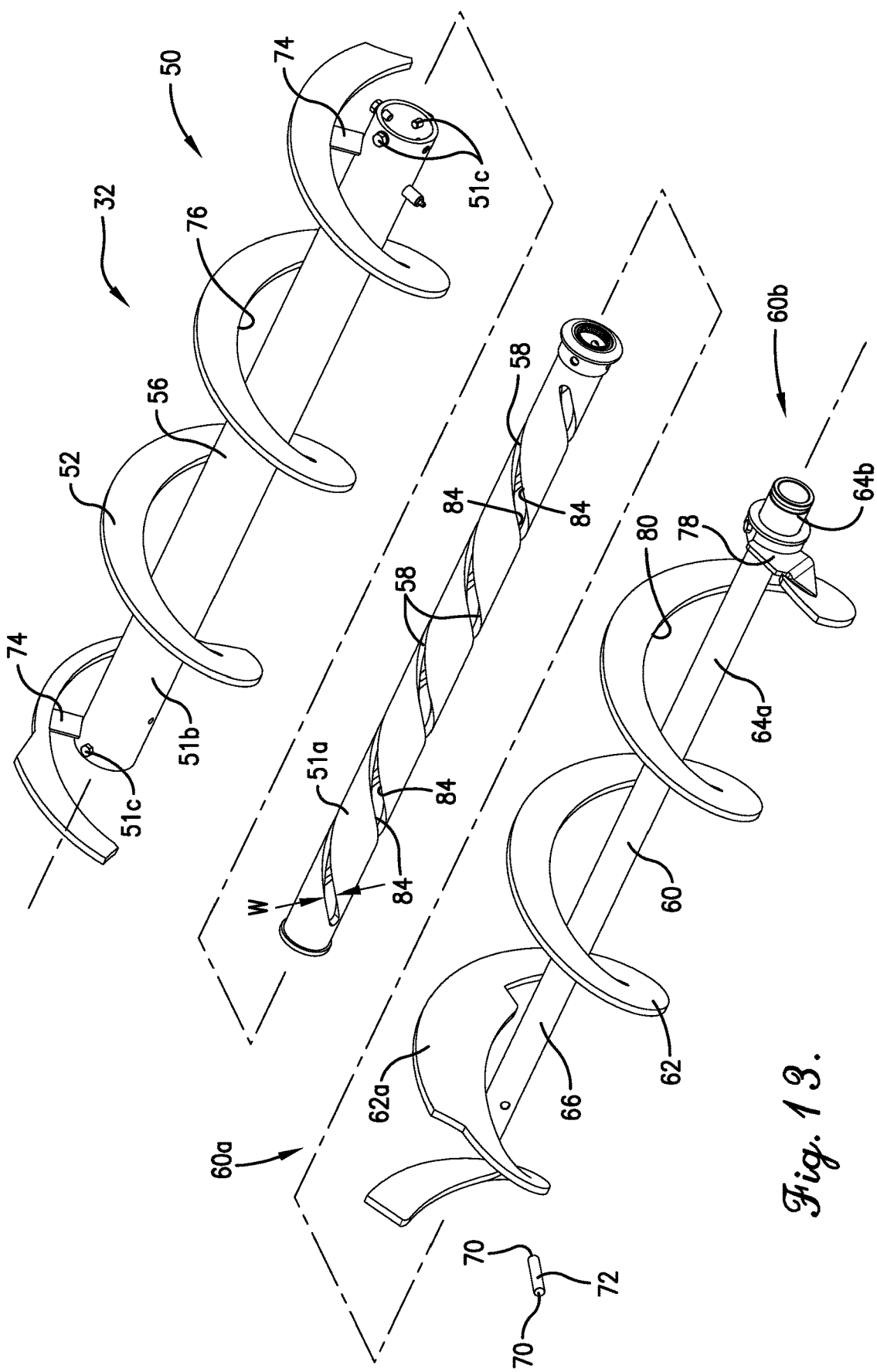
FIG. 13 is an exploded perspective of the telescoping auger shown in FIGS. 11 and 12.
Figure 14:
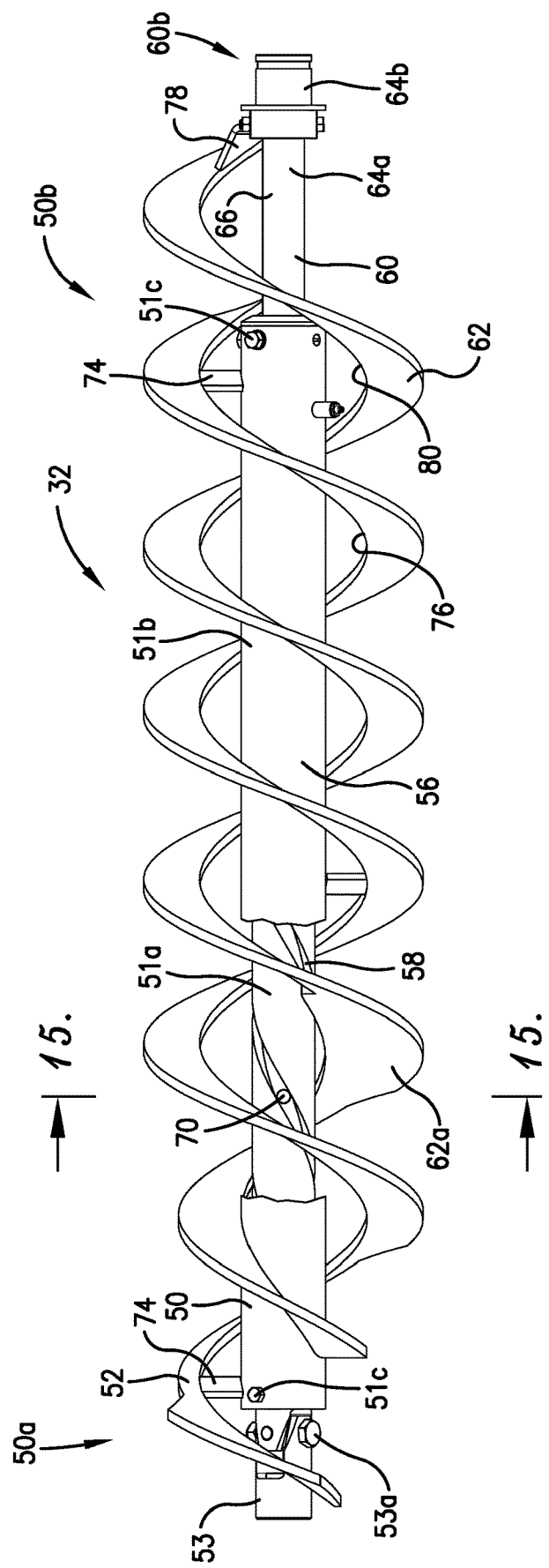
FIG. 14 is an elevation view of the telescoping auger shown in FIG. 11, showing part of the first shaft removed to show a guide element of the second shaft slidably engaged with a groove of the first shaft.

The operable length L of the auger 32 (see FIG. 5) may increase and decrease upon the respective extension and retraction of the second shaft 60. Specifically, each telescoping auger 32 can be shifted into and out of a retracted configuration, as shown in FIGS. 1-3, in which the second shaft 60 is retracted within the first shaft 50. In the depicted embodiment, the length dimension L of the auger 32 is at a minimum value when the second shaft 60 is retracted. In the retracted configuration, it will be understood that the second shaft 60 is not entirely received inside the first shaft 50, such that part of the second shaft 60 is located outside of the first shaft 50. However, one or more augers could be alternatively configured in the retracted configuration (for instance, where the second shaft is located entirely inside the first shaft in the retracted configuration).

Furthermore, each telescoping auger 32 may be shifted into and out of an extended configuration, as shown in FIGS. 4-7, in which the second shaft 60 is extended from the first shaft 50. In the depicted embodiment, the length dimension L of the auger 32 is at a maximum value when the second shaft 60 is extended. In the extended configuration, it will be understood that the second shaft 60 is not entirely received inside the first shaft 50, such that part of the second shaft 60 is located inside of the first shaft 50. However, one or more augers could be alternatively configured in the extended configuration (for instance, where the second shaft is located entirely outside the first shaft in the extended configuration).

The illustrated shafts 50,60 are preferably at least substantially coaxial with one another. The illustrated construction of shafts 50,60 permits the shafts 50,60 to be axially slidable and rotatable relative to each other. However, for at least certain aspects of the present invention, one or both of the shafts may be alternatively configured so that the shafts are not coaxial with each another. For instance, alternative shaft sections may be axially offset from each other while being operably connected so as to permit relative axial sliding and relative rotational movement therebetween.

Turning again to FIGS. 11-16, the first auger section 52 extends helically around the first exterior surface 56 of the first shaft 50. The first auger section 52 is preferably fixed to the first shaft 50 by connectors 74 located adjacent to respective ends of the first shaft 50. A radially inner edge 76 of the first auger section 52 is spaced radially outwardly from the first exterior surface 56 at locations between the connectors 74.

However, in alternative embodiments, it will be appreciated that one or more parts of the first auger section between the connectors may be fixed to, or otherwise contact, the first exterior surface 56. Such an alternative auger configuration may provided for various reasons (for instance, to provide suitable auger strength and/or desired material flow).

The second auger section 62 preferably extends helically around the exterior surface 66 of the second shaft 60. The second auger section 62 is secured to a distal end 60b of the second shaft 60 by a connector 78. A radially inner edge 80 of the second auger section 62 is spaced radially outwardly from the second exterior surface 66 of the second shaft 60 at locations proximal to the distal end 60b.

However, in alternative embodiments, it will be appreciated that one or more alternative parts of the second auger section may be fixed to, or otherwise contact, the second exterior surface. However, it is preferable that such alternative configurations permit relative extension and contraction between the shafts 50,60 and auger sections 52,62.

As the second shaft 60 extends from and retracts within the first shaft 50, the second auger section 62 preferably extends across the first exterior surface 56 of the first shaft 50. In the illustrated embodiment, a proximal portion 62a of the second auger section 62 is configured so that a corresponding part of the inner edge 80 contacts the first exterior surface 56 (see FIGS. 14 and 15). As a result, the second auger section 62 engages the first exterior surface 56 to restrict off-axis movement of the second auger section 62 relative to the axes of the shafts 50,60.

Because each of the first and second shafts 50,60 of the telescoping auger 32 includes a section 52,62 of auger fighting extending in a spiral or helical manner from an exterior of the respective shaft, the second shaft 60 must rotate when extending and retracting with respect to the first shaft 50. If the second shaft 60 does not rotate, the sections 52,62 of auger fighting would interfere with each other during extension/retraction of the second shaft 60.

In more detail, when the telescoping auger 32 is in the retracted position (i.e., with the second shaft 60 retracted within the first shaft 50), the section 62 of auger fighting of the second shaft 60 is wound outside the first shaft 50 between the spirals of the section 52 of auger fighting of the first shaft 50. As such, to extend the second shaft 60 from the first shaft 60 (including the extension of the section 62 of auger flighting of the second shaft 60), the second shaft 60 will need to be rotated as it is linearly extended. Such rotation will permit the auger fighting of the second shaft 60 to be unwound from between the auger fighting of the first shaft 50 (see FIG. 12).

To facilitate rotation of the second shaft 60 with respect to the first shaft 50, the interior surface 54 of the first shaft 50 is preferably formed with grooves 58 that extend along the length of the first shaft 50 in a spiral or helical shape. It should be noted that, although the interior surface 54 presents grooves 58, the exterior surface 56 of the first shaft 50 preferably comprises a solid, continuous surface that covers the grooves 58. Furthermore, the first shaft 50 is preferably constructed so that the interior space 68 is enclosed.

In the depicted embodiment, the grooves are illustrated as each having a constant pitch helix (such that the pitch is constant along the length of the groove). However, in alternative embodiments, the grooves may have a variable pitch helix (for instance, to match the pitch associated with the auger flighting). Alternative shaft embodiments may also have grooves with one or more sections that are straight or have another non-helical shape. Furthermore, alternative embodiments may have one or more sections located along the groove length to facilitate positioning of the shafts relative to each other. For instance, the grooves may each have a notch that extends off axis relative to the helical axis of the groove for providing a discrete location that removably receives the guide element while restricting relative axial movement between the shafts.

The proximal end 60a of the second shaft 60 may be formed with guide elements 70. The guide elements 70 are preferably defined by the guide pin 72, which extends through an opening in the shaft body 64a of the second shaft 60. Thus, the guide elements 70 are supported by the shaft body 64a and extend from the exterior surface 66 of the second shaft 60. In the depicted embodiment, the guide elements 70 preferably comprise opposite exposed ends of the guide pin 72. The guide elements 70 of the guide pin 72 are preferably configured to slidably engage respective grooves 58 formed along the interior surface 54 of the first shaft 50. Consequently, as the second shaft 60 extends and retracts with respect to the first shaft 50, the guide elements 70 will follow along the grooves 58 so as to cause the second shaft 60 to rotate with respect to the first shaft 62.

It is within the ambit of the present invention for the telescoping auger to have one or more alternatively configured guide elements. In alternative embodiments, the second shaft may be provided with a single guide element or more than two guide elements. In such embodiments, it will be appreciated that each guide element is operable to be slidably engaged with a corresponding groove. Although the depicted guide element preferably comprises a pin, alternative guide elements may include other types of projecting elements, such as a stud, ridge, shoulder, etc.

In the depicted embodiment, the first shaft 50 preferably includes a pair of helically extending grooves 58 formed along the interior surface 56 of the first shaft 50 to receive respective guide elements 70 of the guide pin 72. Each groove 58 is defined by opposite groove sides 84 that generally extend parallel to one another along the length of the groove 58 so that the groove 58 has a substantially constant groove width dimension W (see FIG. 13). Furthermore, each depicted groove 58 has a cross-sectional shape such that the groove sides 84 generally extend parallel to one another along a radial direction (see FIG. 15).

However, it is contemplated within the scope of the present invention for the telescoping auger to have one or more alternatively configured grooves. For instance, alternative embodiments of the first shaft may have a single groove or more than two grooves. An alternative first shaft may have one or more grooves presenting an alternative groove shape. For instance, one or more alternative grooves may be shaped so that at least part of the groove does not have a helical shape. One or more alternative grooves may have a cross-sectional shape so that the groove sides are not parallel to one another along the radial direction. For instance, the groove sides may converge toward each other or diverge from each other in a radially outward direction.

Again, the second shaft 60 presents the interior space 68 to receive the first shaft 50. In the preferred embodiment, the shafts 50,60 cooperatively provide a sealed chamber 86 associated with the interior space 68 (see FIG. 16). The first shaft 50 preferably includes an end cap 88a and seal 88b attached to the sleeves 51a,b at the distal end 50b to enclose the chamber 86 and sealingly engage the second shaft 60 (see FIG. 16). The chamber 86 is configured to receive grease (not shown) therein, particularly at locations where sliding engagement occurs between the shafts 50,60. In this manner, the depicted shafts 50,60 are preferably self-lubricated and generally facilitates reliable shaft operation.

The chamber 86 is preferably sealed to restrict debris and/or other contaminants from interfering with sliding engagement between the shafts. The sealed auger would also preferably restrict grease within the chamber 86 from leaking out of the telescoping auger. As will be discussed in a subsequent embodiment, the chamber may be configured to receive pressurized hydraulic fluid or compressed air.

To permit the section 62 of auger fighting of the second shaft 60 to pass over the exterior surface 56 of the first shaft 50 and to be unwound from the section 52 of auger flighting of the first shaft 50, the second auger section 62 may only be secured to the second shaft 60 at a single connection provided by the connector 78. The remaining portions of the second auger section 62 may extend down the length of the second shaft 60 in a spaced apart manner from the exterior surface 66 of the second shaft 60. The extent to which the second auger section 62 is spaced apart from the exterior surface 66 of the second shaft 60 is preferably configured to permit the second auger section 62 to pass over the first exterior surface 56 of the first shaft 50 when the second shaft 60 extends from and retracts into the first shaft 50. In contrast, the first auger section 52 may be fixedly attached at spaced apart locations by the connections 74.

Each telescoping auger 32 is preferably rotatably supported relative to the auger supports 46,48 by motors 40 and bearings 90. In particular, the motors 40 are operably supported on respective end auger supports 46, while the bearings 90 are operably supported on the intermediate auger support 48. Furthermore, the drive coupler 53 of the first shaft 50 is drivingly attached to and supported by an output shaft (not shown) of a respective motor 40. The coupler 64b of the second shaft 60 is rotatably supported by a respective bearing 90.

It is also within the ambit of the present invention for the telescoping auger to be alternatively supported for rotation. For instance, in alternative auger embodiments, it will be appreciated that both ends of the auger may be supported by bearings, bushings, and/or other elements suitable for supporting a rotatable shaft.

Although the telescoping auger 32 is directly attached to the output shaft of the motor 40, alternative embodiments may include one or more transmission elements to drivingly interconnect the motor output shaft and the auger. Such transmission elements may include gears, sprockets, chains, pulleys, belts, and/or other drive elements. In alternative embodiments, it will be understood that the motor output shaft may be axially offset from the telescoping auger, such that one or more transmission elements are required to drivingly connect the motor and auger.

While rotatably supported in the illustrated manner, the telescoping auger 32 is operable to be selectively rotated by the respective motor 40. At the same time, this supporting arrangement permits relative rotation between the shafts 50,60 of the auger 32 during such linear actuation of the auger (that is, during extension and contraction of the auger). It will be understood that extension and/or contraction of the auger may occur while both shafts 50,60 of the auger 32 are rotated in the same direction (i.e., where one shaft is being turned faster than the other shaft). In particular, while the motor 40 is rotating the illustrated auger 32, the auger 32 may be simultaneously extended or retracted as the corresponding box frame cylinders 38 are expanded or contracted. In alternative embodiments, the telescoping auger may be extended or retracted by an alternative means, as shown in a subsequent embodiment. It will be appreciated that extension and/or retraction of alternative auger embodiments may be done while the auger shafts are being rotated.

In operation, each telescoping auger 32 can be rotated such that the sections of auger flighting are operable to move product across the length of the telescoping auger 32. Furthermore, however, the second shaft 60 of the telescoping auger 32 can move axially with respect to first shaft 50, such that the operable length L of the telescoping auger 32 can increase and decrease. The second shaft 60 may, in some embodiments, engage an inner portion of first shaft 50 such that a portion of the first shaft 50 is coextensive with the second shaft 60.

As the second shaft 60 moves with respect to first shaft 50, the guide elements 70 of the second shaft 60 engage and slide along respective grooves 58 of the first shaft 50, so as to cause the second shaft 60 to rotate with respect to first shaft 50. In this fashion, rotation of the second shaft 60 (as provided via the grooves 58 and guide elements 70) functions to prevent the second auger section 62 attached to the distal end 60b of the second shaft 60 from interfering with the first auger section 52 attached to the first shaft 50. Furthermore, as noted above, the second auger section 62 may be fixedly attached only to the distal end 60b of second shaft 60 such that the second auger section 62 can slide on top of (or above) the first shaft 50 (i.e., on the exterior surface 56 of the first shaft 50) as the second shaft 60 moves in and out of the first shaft 50. In certain embodiments, a portion of the second auger section may remain in contact with the exterior surface of the first shaft, as the second shaft extends and retracts.

Embodiments provide for the telescoping auger 32 described above to be used in various technologies. As noted above, the telescoping auger 32 may be used in the spreader box 30, which is part of a mobile paving system for depositing slurry onto a surface and is pulled behind a slurry machine (not shown). The ability of the mobile paving system to satisfactorily apply the slurry to the surface can depend upon the ability of the system to evenly distribute the slurry across the full width of the spreader box. Some mobile paving systems can use auger fighting or paddles mounted on rotating shafts to distribute the slurry across the full width of the spreader box. The spreader box width determines the width of the surface that can be treated.

Embodiments of the telescoping auger may be used in applications other than a spreader box. As will be described, the telescoping auger may be integrated into a crop harvesting machine to convey crop material (such as harvested grain) into or out of a material holding storage bin (such as a grain tank). It will be appreciated that the auger of the present invention may be utilized in other applications (such as other types of agricultural machines). For instance, the inventive auger may be provided as part of a grain cart, a standalone grain transfer auger, or another auger used for crop material transfer.

It is a technical advantage of the present invention that the telescoping auger 32 can vary in length by extending the second shaft 60 with respect to the first shaft 50 as the second shaft rotates. In particular, such rotation is due to engagement between the guide elements 70 associated with the second shaft 60 and helical grooves 58 associated with the first shaft 50.

Although the above description provides for the second shaft 60 to extend and retract from within the first shaft 50, it should be understood that actuation of the telescopic auger 32 can be initiated on either or both shafts 50,60. As depicted, the proximal end of the first shaft 50 and the distal end of the second shaft 60 may be secured to respective parts of the box frame sections 34,36. The auger supports 46 are preferably actuated/moved, so as to cause actuation of the first shaft 50 of the telescoping auger 32. In particular, the auger support 48 preferably restricts axial movement of the second shaft 60, while the auger support 46 to which the first shaft 50 is secured may be extended and retracted, so as to cause extension and retraction of the first shaft 50 with respect to the second shaft 60.

To permit the first shaft 50 to rotate during linear actuation (i.e., as a result of the guide element 70 of the second shaft 60 sliding along the groove 58 of the first shaft 50), first and second shafts 50,60 are preferably rotatably supported relative to the auger supports 46,48 by motors 40 and bearings 90, although the shafts may be rotatably supported by one or more alternative components.

Again, it is within the ambit of the present invention for one or both shafts to be alternatively actuated for changing the auger length. For example, alternative embodiments of the telescoping augers may be alternatively supported by the box frame sections. In an alternative embodiment, the first shaft may be supported by the stationary auger support 48 and restricted from moving axially, while the second shaft is supported by the movable auger support 46 so that the first shaft may be extended and retracted. In such an alternative embodiment, the first and second shafts are preferably rotatably supported relative to the auger supports.

Thus, the above description illustrates how the telescoping auger can be extended and retracted via linear actuation of the first shaft 50 and/or the second shaft 60. For instance, the second shaft 60 can be linearly extended/retracted with respect to the first shaft 50 by actuating the first shaft 50 while holding the second shaft 60 stationary. In alternative embodiments, the second shaft can be linearly extended/retracted with respect to the first shaft by actuating the second shaft while restricting the first shaft from moving axially. In either case, such linear actuation will include a rotation of the second shaft with respect to the first shaft (i.e., as a result of the guide elements sliding along the grooves). In even further alternatives, the second shaft can be extended/retracted while both the first shaft and the second shaft are simultaneously rotating (i.e., during operation of the telescoping auger).

In further embodiments, the second shaft may be configured to extend and retract with respect to the first shaft due to rotation of either the first shaft or the second shaft. For instance, a distal end of the second shaft may be rotated in a first direction to cause the second shaft to extend from the first shaft (via the guide element passing along the groove), whereas the second shaft may be rotated in a second direction to cause the second shaft to retract within the first shaft. Such relative linear actuation between the first and second shafts may alternatively be caused by rotation of the first shaft. The rotation may be imparted to the shafts by rotating motors, or other similar mechanisms, being secured to the ends of the shafts.

It is a further technical advantage of the present invention that the configuration of the guide element extending from the second shaft and the groove formed on the interior surface of the first shaft provide a self-contained, sealed system. Such a sealed system may eliminate the contamination of the interior components of the telescoping auger from exterior product or debris. For example, when the telescoping auger is used on in a spreader box to supply slurry, the sealed configuration of the telescoping auger inhibits slurry from entering into interior portions of the telescoping auger, which would require significant maintenance, cleaning, and/or repair. The sealed configuration of the telescoping auger would also preferably inhibit contamination of exterior product by, for instance, the grease contained within the chamber 86 of the telescoping auger.

In certain embodiments, actuation of the telescoping auger may be controlled by a control system. The control system may be electronic, hydraulic, pneumatic, or combinations thereof. Regardless, the control system may provide for the extension of the telescoping auger to be precisely controlled. In addition, the control system can control the timing of the extension and retraction of the second shaft with respect to the first shaft, as well as the rotation of the second shaft with respect to the first shaft. Finally, the control system may also precisely control the overall rotation rate of the telescoping auger.

Alternative Embodiments

Turning to FIGS. 16A-22, alternative embodiments of the present invention are depicted. For the sake of brevity, the remaining description will focus primarily on the differences of these alternative embodiments from the preferred embodiment described above.

Figure 16A:
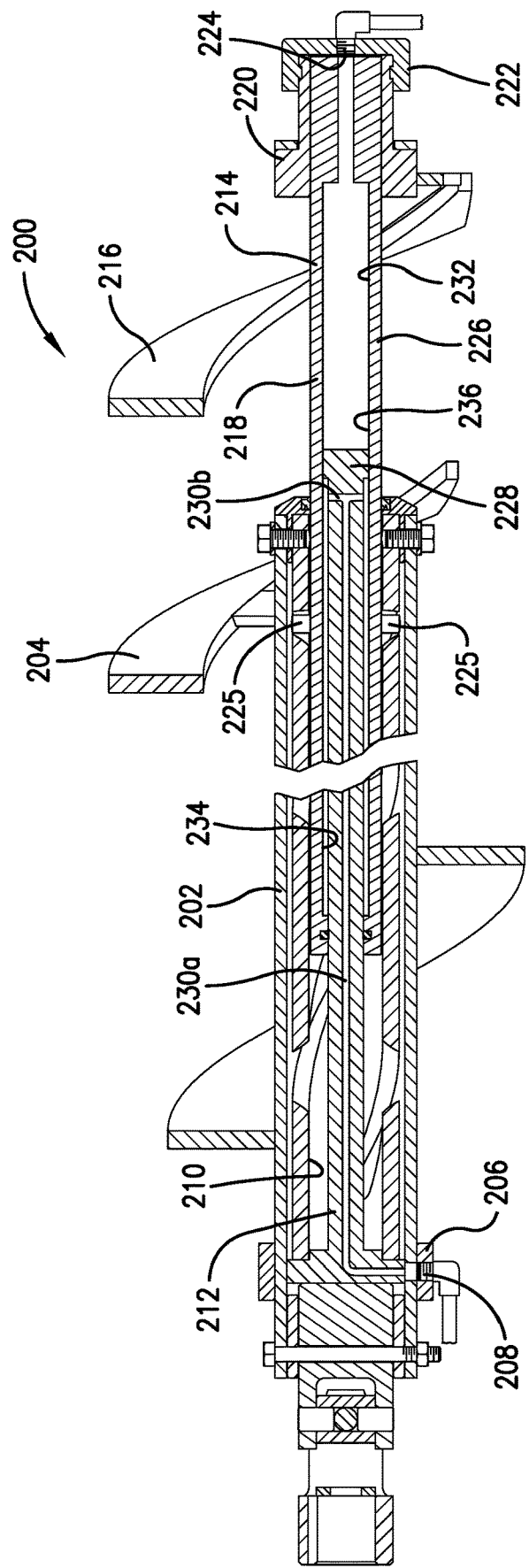
FIG. 16A is a schematic cross-section view of a telescoping auger constructed in accordance with a second embodiment of the present invention.

Turning to FIG. 16A, a schematic illustration of an alternative telescoping auger 200 is depicted. The auger 200 is preferably configured to extend and retract itself using hydraulic power. The telescoping auger 200 preferably includes a first shaft 202 with a first auger section 204. The first shaft 202 includes a hydraulic fitting 206 that provides a first port 208. The first shaft 202 also presents an interior space 210.

The telescoping auger 200 also preferably includes an interior rod 212 and an alternative second shaft 214 with a second auger section 216. The second shaft 214 includes a shaft body 218, a coupler 220, and a hydraulic fitting 222 attached to the coupler 220 to provide a second port 224. The second shaft 214 also includes trunnion pins 225 attached to the shaft body 218. The shaft body 218 presents a second exterior surface 226. The second exterior surface 226 preferably has an outside diameter that serves as a guide for sliding movement between the first shaft 202 and the second shaft 214.

The illustrated rod 212 is mounted at a proximal end to the first shaft 202 and includes a piston 228 located at a distal end. The rod 212 also presents passages 230a,b that fluidly communicate with the first port 208. The shaft body 218 has a hollow cylinder shape and presents an internal bore 232 that slidably receives the rod 212. The shaft body 218 and rod 212 cooperatively define a proximal chamber 234, which is located on a proximal side of the piston 228, and a distal chamber 236, which is located on a distal side of the piston 228.

In the depicted embodiment, the telescoping auger 200 is configured similar to a hydraulic cylinder with the first port 208 positioned adjacent a proximal end of the first shaft 202, such that hydraulic fluid can be injected through the first port 208, passages 230a,b, and into the proximal chamber 234. The injection of hydraulic fluid into the proximal chamber 234 urges the second shaft 214 to retract into the interior space 210 the first shaft 202. Beneficially, during retraction, the trunnion pins 225 of the second shaft 214 will follow along grooves 240 of the first shaft 202 so as to cause the second shaft 214 to rotate. In this manner, the second shaft 214 is configured to be actuated in a proximal direction by injecting hydraulic fluid into the proximal chamber 234.

Similarly, the second port 224 may be positioned adjacent to a distal end of the second shaft, such that the injection of hydraulic fluid through the second port 224 and into the distal chamber 236 will cause extension of the second shaft 214 with respect to the first shaft 202 (while still providing for the second shaft to rotate with respect to the second shaft). During extension, trunnion pins 225 of the second shaft 214 will follow along grooves 240 of the first shaft 202 so as to cause the second shaft 214 to rotate. Thus, the second shaft 214 is configured to be actuated in a distal direction by injecting hydraulic fluid into the distal chamber 236.

During retraction of the first shaft 202, a supply of hydraulic fluid may be provided to the first port 208 for injection into the proximal chamber 234. At the same time, hydraulic fluid may also be drawn from the distal chamber 236 via the second port 224 to facilitate retraction of the first shaft 202. It will be understood that a hydraulic pump (not shown), such as a gear pump, may be used to pump hydraulic fluid into and out of the chambers 234,236. Although pressurized hydraulic fluid is preferably used to extend and retract the auger, an alternative pressurized fluid, such as compressed air, may be used to extend and retract the auger.

During extension of the first shaft 202, a supply of hydraulic fluid may be provided to the second port 224 for injection into the distal chamber 236. At the same time, hydraulic fluid may also be drawn from the proximal chamber 234 via the first port 208 to facilitate extension of the first shaft 202.

The telescoping auger 200 is preferably operable as a linear actuator to actuate the second shaft 214 while the first shaft 202 remains stationary. However, the telescoping auger may be alternatively configured and used to actuate the first shaft 202 while the second shaft 214 remains stationary. Furthermore, the telescoping auger may be operable to actuate both the first and second shafts 202,214.

Preferably, the first shaft 202 and second shaft 214 are sealingly secured together, such that hydraulic fluid does not leak from the chambers 234,236 or from other parts of the shafts 202,214. Furthermore, sealing engagement preferably restricts external debris from entering the chambers 234,236 and the interior space 210 of the first shaft 202.

Similar to the above-referenced telescoping auger embodiment, it is a technical advantage of the present invention that the configuration of the trunnion pins 225 extending from the second shaft 214 and the grooves 240 formed by the first shaft 202 are provided as part of a self-contained, sealed system. Again, the sealed system may eliminate the contamination of the interior components of the telescoping auger from exterior product or debris. The sealed configuration of the telescoping auger would also inhibit contamination of exterior product, by for instance, the hydraulic fluid of the telescoping auger. Beneficially, such hydraulic fluid may also act as a lubricant as the second shaft (and the guide element) extends and retracts with respect to the first shaft (and the groove). Thus, the telescoping auger that incorporates hydraulic cylinder features may be self-lubricating, with lubrication being replaced each time the telescoping auger is extended/retracted.

Turning to FIGS. 17-22, a crop harvesting machine 300 preferably includes alternative telescoping augers 302a, 302b,302c. The telescoping auger 302a is configured to be provided as part of an unloading auger assembly 304 associated with the crop harvesting machine 300 (see FIGS. 17 and 18). The unloading auger assembly 304 includes a tubular auger housing 306 and the telescoping auger 302a received in the auger housing 306. The auger housing 306 includes proximal and distal housing sections 306a,306b that are telescopically engaged with one another to permit the length of the auger housing 306 to be adjustable. The auger housing 306 also presents an auger inlet 308, auger outlet 310, and a passage 311 that fluidly communicates with the inlet 308 and outlet 310.

The telescoping auger 302a includes first and second shafts 312,314, and first and second auger sections 316,318 attached to respective shafts 312,314. As with the previous auger embodiments, the telescoping auger 302a is configured to be selectively shifted between a retracted configuration (see FIG. 17) and an extended configuration (see FIG. 18) to change a length dimension L of the auger 302a.

Preferably, the first and second shafts 312,314 are operably attached to corresponding proximal and distal housing sections 306a,306b. As a result, the distal housing section 306b and the second shaft 314 are preferably axially slidable with each other as the auger 302a is shifted between the retracted and extended configurations.

The unloading auger assembly 304 is operable to receive harvested grain (or other crop material) from a grain tank 320 and transfer the grain distally for discharge from the outlet 310. In the usual manner, the auger assembly 304 is configured to empty grain from the grain tank 320 and transfer the grain to another storage bin, such as a grain truck or grain cart (not shown), adjacent the harvesting machine 300.

Turning to FIGS. 19 and 20, the telescoping auger 302b is preferably provided as part of a "bubble-up" auger assembly 322 located inside the grain tank 320 of the crop harvesting machine 300. The auger assembly 322 includes a tubular auger housing 324 and the telescoping auger 302b received in the auger housing 324. The auger housing 324 includes proximal and distal housing sections 324a,324b that are telescopically engaged with one another to permit the length of the auger housing 324 to be adjustable. The auger housing 324 also presents an auger inlet 326, auger outlet 328, and a passage 330 that fluidly communicates with the inlet 326 and outlet 328.

The telescoping auger 302b includes first and second shafts 332,334, and first and second auger sections 336,338 attached to respective shafts 332,334. As with the previous auger embodiments, the telescoping auger 302b is configured to be selectively shifted between a retracted configuration (see FIG. 19) and an extended configuration (see FIG. 20) to change a length dimension L of the auger 302b.

Preferably, the first and second shafts 332,334 are operably attached to corresponding proximal and distal housing sections 324a,324b. As a result, the distal housing section 324b and the second shaft 334 are preferably axially slidable with each other as the auger 302b is shifted between the retracted and extended configurations.

The auger assembly 322 is operable to transfer harvested grain into the grain tank 320 via the outlet 328. The auger assembly 322 is preferably configured so that the outlet 328 can be selectively positioned relative to the grain tank 320. For instance, as the amount of stored grain G in the grain tank 320 increases, the auger assembly 322 may be selectively lengthened to maintain the outlet 328 at a position above the stored grain G. It will be appreciated that such lengthening of the auger assembly 322 is configured to minimize load experienced by the auger 302b during transfer of grain into the grain tank 320.

Turning to FIGS. 21 and 22, an alternative telescoping auger 302c is configured to operate as tank clean-out auger assembly 340 inside the grain tank 320 of the crop harvesting machine 300. The auger assembly 340 includes a tubular auger housing 342 and the telescoping auger 302c received in the auger housing 342. The auger housing 342 includes proximal and distal housing sections 342a,342b that are telescopically engaged with one another to permit the length of the auger housing 342 to be adjustable. The auger housing 342 also presents an auger inlet 346, auger outlet 348, and a passage 350 that fluidly communicates with the inlet 346 and outlet 348.

The telescoping auger 302c includes first and second shafts 352,354, and first and second auger sections 356,358 attached to respective shafts 352,354. As with the previous auger embodiments, the telescoping auger 302c is configured to be selectively shifted between a retracted configuration (see FIG. 21) and an extended configuration (see FIG. 22) to change a length dimension L of the auger 302c.

Preferably, the first and second shafts 352,354 are operably attached to corresponding proximal and distal housing sections 342a,342b. As a result, the distal housing section 342b and the second shaft 354 are preferably axially slidable with each other as the auger 302c is shifted between the retracted and extended configurations.

The auger assembly 340 is operable to transfer harvested grain out of the grain tank 320 via the inlet 346. The auger assembly 340 is preferably configured so that the inlet 346 can be selectively positioned relative to the grain tank 320. For instance, the auger length is preferably minimized when the tank 320 is relatively full of grain. By reducing the auger length, the auger assembly 340 is configured to experience relatively reduced load when operation of the auger assembly 340 is initiated to begin transferring grain out of the grain tank 320. However, as the amount of stored grain in the grain tank 320 decreases, the auger assembly 340 may be selectively lengthened to increase the auger inlet area configured to receive grain. This selective lengthening of the auger assembly 340 permits the auger 302c to more efficiently transfer grain out of the grain tank 320 after grain transfer by the auger assembly 340 has been initiated.

Again, it will be understood that the telescoping auger of the present invention may be utilized in other material transfer applications (such as other types of agricultural machines). For instance, auger embodiments similar to the auger assemblies 304,322,340 be provided as part of a grain cart or a standalone grain transfer auger for grain transfer.

Although the present invention has been described in detail, it should be understood that various changes, substitutions and alterations can be made thereto without departing from the spirit and scope of the invention as defined by the appended claims. Some embodiments of the present invention may share certain features and functionalities described in U.S. Pat. No. 5,980,153, which is hereby incorporated in its entirety by reference herein.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A telescoping rotatable tool configured to move material, said telescoping rotatable tool comprising:
   a first shaft with a first material-engaging element extending from an exterior surface of said first shaft; and
   a second shaft with a second material-engaging element extending from an exterior surface of said second shaft,
   wherein the second shaft is configured to extend from and retract within an interior space presented by said first shaft,
   wherein said first shaft includes at least one helical-shaped groove extending along an interior surface of said first shaft,
   wherein said second shaft includes at least one guide element extending from the exterior surface of said second shaft,
   wherein said guide element is configured to engage with said groove, such that as said second shaft extends from and retracts within said first shaft, said second shaft is configured to rotate with respect to said first shaft.

2. The telescoping rotatable tool as claimed in claim 1,
   wherein said telescoping rotatable tool is configured as a hydraulic cylinder,
   wherein said second shaft is configured to be actuated by injecting hydraulic fluid into the interior space of said first shaft.

3. The telescoping rotatable tool as claimed in claim 2,
   wherein the hydraulic fluid is injected between a proximal end of said first shaft and a proximal end of said second shaft,
   wherein the pressure of the hydraulic fluid causes the second shaft to extend from within the interior space of the first shaft.

4. The telescoping rotatable tool as claimed in claim 2,
   wherein the hydraulic fluid is injected between a distal end of said first shaft and a proximal end of said second shaft, wherein the pressure of the hydraulic fluid causes said second shaft to retract within the interior space of said first shaft.

5. The telescoping rotatable tool as claimed in claim 2, wherein the hydraulic fluid acts as a lubricant between said first shaft and said second shaft, wherein the hydraulic fluid acts as a lubricant between said guide element of said second shaft and said groove of said first shaft.

6. The telescoping rotatable tool as claimed in claim 2, wherein said first shaft and said second shaft are sealingly secured together, such that hydraulic fluid does not leak from the interior space of said first shaft, wherein said first shaft and said second shaft are sealing secured together, such that external product or debris is restricted from contaminating the interior space of said first shaft.

7. The telescoping rotatable tool as claimed in claim 1, wherein said telescoping rotatable tool is actuated by a linear actuator.

8. The telescoping rotatable tool as claimed in claim 7, wherein said linear actuator actuates said second shaft, while said first shaft remains stationary.

9. The telescoping rotatable tool as claimed in claim 7, wherein said linear actuator actuates said first shaft, while said second shaft remains stationary.

10. The telescoping rotatable tool as claimed in claim 1, wherein said telescoping rotatable tool is actuated by a rotary actuator.

11. The telescoping rotatable tool as claimed in claim 10, wherein said rotary actuator is selected from an electric motor, a hydraulic motor, and a pneumatic motor.

12. The telescoping rotatable tool as claimed in claim 10, wherein said rotary actuator actuates said second shaft, while said first shaft remains stationary.

13. The telescoping rotatable tool as claimed in claim 1, wherein said at least one helical-shaped groove comprises a pair of helical-shaped grooves.

14. The telescoping rotatable tool as claimed in claim 13, wherein said at least one guide element comprises a pair of guide elements.

15. The telescoping rotatable tool as claimed in claim 1, wherein said first material-engaging element comprises a first auger section that is secured along an exterior surface of said first shaft, wherein said first auger section extends helically around the exterior surface of said first shaft.

16. The telescoping rotatable tool as claimed in claim 1, wherein said second material-engaging element comprises a second auger section that is secured to a distal end of said second shaft, and wherein said second auger section extends along and spaced above an exterior surface of said second shaft, wherein said second auger section extends helically around the exterior surface of said second shaft.

17. The telescoping rotatable tool as claimed in claim 16, wherein as the second shaft extends from and retracts within the first shaft, said second auger section extends across an exterior surface of said first shaft.

18. A method of using a telescoping rotatable tool, said method comprising the steps of:
providing the telescoping rotatable tool, which comprises a first shaft with a first material-engaging element extending exteriorly therefrom, and a second shaft with a second material-engaging element extending exteriorly therefrom, wherein the second shaft is configured to extend from and retract within an interior space presented by the first shaft,
wherein the first shaft includes a helical-shaped groove extending along an interior surface of the first shaft,
wherein the second shaft includes an engagement element extending from an exterior surface of the second shaft, and wherein the engagement element is received within the groove; and
causing the second shaft to extend from the interior space of the first shaft,
wherein as the second shaft is extended, the engagement element travels through the groove causing the second shaft to rotate with respect to the first shaft.

19. The method as claimed in claim 1, further comprising the step of:
causing the second shaft to retract within the interior space of the first shaft,
wherein as the second shaft is retracted, the engagement element travels through the groove causing the second shaft to rotate with respect to the first shaft.

20. The method as claimed in claim 19, wherein the second shaft is caused to retract by injecting hydraulic fluid in the interior space of the first shaft, wherein the hydraulic fluid is injected through a port positioned adjacent to a distal end of the first shaft.

21. The method as claimed in claim 18, wherein the second shaft is caused to extend by injecting hydraulic fluid in the interior space of the first shaft, wherein the hydraulic fluid is injected through a port positioned adjacent to a proximal end of the first shaft.

22. The method as claimed in claim 18, wherein said first material-engaging element comprises a first auger section and said second material-engaging element comprises a second auger section, wherein as the second shaft is extended, the second auger section of the second shaft unwinds from the first auger section of the first shaft.

23. The method as claimed in claim 18, wherein the second shaft rotates with respect to the first shaft by holding the first shaft stationary and rotating the second shaft.

24. The method as claimed in claim 18, wherein the second shaft rotates with respect to the first shaft by holding the second shaft stationary and rotating the first shaft.

25. The method as claimed in claim 18, wherein the second shaft rotates with respect to the first shaft while each of the first shaft and the second shaft are rotating.

* * * * *